(12) United States Patent
Bi

(10) Patent No.: US 12,438,976 B2
(45) Date of Patent: Oct. 7, 2025

(54) DEVICE CAPABILITY SCHEDULING METHOD AND ELECTRONIC DEVICE

(71) Applicant: Huawei Technologies Co., Ltd., Shenzhen (CN)

(72) Inventor: Sheng Bi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 769 days.

(21) Appl. No.: 17/761,867

(22) PCT Filed: Sep. 4, 2020

(86) PCT No.: PCT/CN2020/113626
§ 371 (c)(1),
(2) Date: Mar. 18, 2022

(87) PCT Pub. No.: WO2021/052200
PCT Pub. Date: Mar. 25, 2021

(65) Prior Publication Data
US 2022/0368792 A1   Nov. 17, 2022

(30) Foreign Application Priority Data
Sep. 19, 2019 (CN) .......................... 201910887687.8

(51) Int. Cl.
*H04M 1/72415* (2021.01)
(52) U.S. Cl.
CPC .............................. *H04M 1/72415* (2021.01)

(58) Field of Classification Search
CPC .......... H04M 1/72415; H04M 1/72448; H04L 12/2838; H04N 21/4122; H04N 21/41407; H04N 21/43079; H04N 21/43615; H04N 21/4518; H04N 21/485; H04N 7/14; H04N 2007/145
See application file for complete search history.

(56) References Cited

U.S. PATENT DOCUMENTS

| 2012/0147825 A1 | 6/2012 | Hassan et al. |
| 2012/0159340 A1* | 6/2012 | Bae ...................... G06F 3/0488 709/201 |
| 2012/0243469 A1 | 9/2012 | Klein |

(Continued)

FOREIGN PATENT DOCUMENTS

| CN | 102695122 A | 9/2012 |
| CN | 106354107 A | 1/2017 |

(Continued)

*Primary Examiner* — Rami R Okasha
(74) *Attorney, Agent, or Firm* — Conley Rose, P.C.

(57) ABSTRACT

A first electronic device includes a first sub-function and a second sub-function. The first sub-function is different from the second sub-function. The first electronic device detects a first operation of a user. The first electronic device displays a first interface in response to the first operation, where the first interface includes a name of the first sub-function, a device identifier of a second electronic device, a name of the second sub-function, and a device identifier of a third electronic device. The first electronic device detects a second operation of the user on the device identifier of the second electronic device. The first electronic device sends data corresponding to the first sub-function to the second electronic device, so that the second electronic device executes the first sub-function.

20 Claims, 17 Drawing Sheets

(56) References Cited

U.S. PATENT DOCUMENTS

| | | | |
|---|---|---|---|
| 2013/0162908 A1 | 6/2013 | Son et al. | |
| 2014/0188985 A1* | 7/2014 | Park | H04W 4/60 709/203 |
| 2015/0097848 A1 | 4/2015 | Maeda | |
| 2016/0027150 A1 | 1/2016 | Lee et al. | |
| 2016/0036953 A1* | 2/2016 | Lee | H04M 1/05 455/426.1 |
| 2019/0149872 A1 | 5/2019 | Zhang et al. | |
| 2022/0004315 A1 | 1/2022 | Zhang et al. | |

FOREIGN PATENT DOCUMENTS

| | | |
|---|---|---|
| CN | 107659712 A | 2/2018 |
| CN | 107835444 A | 3/2018 |
| CN | 108289340 A | 7/2018 |
| CN | 109168038 A | 1/2019 |
| CN | 109327607 A | 2/2019 |
| CN | 109660842 A | 4/2019 |
| CN | 110221798 A | 9/2019 |
| EP | 2613250 A1 | 7/2013 |
| EP | 3955104 A1 | 2/2022 |
| EP | 3993461 A1 | 5/2022 |
| JP | 2003179906 A | 6/2003 |
| JP | 2006259839 A | 9/2006 |
| KR | 101701859 B1 | 2/2017 |

* cited by examiner

DEVICE CAPABILITY SCHEDULING METHOD AND ELECTRONIC DEVICE

CROSS-REFERENCE TO RELATED APPLICATIONS

This is a U.S. National Stage of International Patent Application No. PCT/CN2020/113626 filed on Sep. 4, 2020, which claims priority to Chinese Patent Application No. 201910887687.8 filed on Sep. 19, 2019. Both of the aforementioned applications are hereby incorporated by reference in their entireties.

TECHNICAL FIELD

This application relates to the field of electronic devices, and in particular, to a device capability scheduling method and an electronic device.

BACKGROUND

With development and popularization of electronic technologies, in addition to a mobile phone, a user may further have another electronic device, for example, various electronic devices such as a tablet computer, a personal computer (personal computer, PC), a smart TV, a vehicle-mounted computer, a speaker, a wireless headset, a smartwatch, and a virtual reality (virtual reality, VR) device. The electronic devices have different capabilities. For example, the PC is good at computing, the smart TV has a good video playing effect, and the speaker has a good audio playing effect.

The mobile phone may establish wireless connections to different electronic devices, and use a capability of a corresponding device, to implement a corresponding function by using the device, and bring good user experience. In other words, the mobile phone may hand over a function that currently needs to be implemented to another device for implementation. In addition, the user may use capabilities of different electronic devices in different scenarios. For example, when the user is driving, a wireless connection may be established between the mobile phone and a vehicle-mounted speaker. In this way, in a driving process, the user may use an audio playing capability of the vehicle-mounted speaker to play music on the mobile phone or answer a call. In other words, the mobile phone may hand over a function of playing music or answering a call from the mobile phone to the vehicle-mounted speaker for implementation. For another example, when the user watches a video at home, a wireless connection may be established between the mobile phone and a TV. In this way, the mobile phone may use a video playing capability of the TV to play the video from the mobile phone. In other words, the mobile phone may hand over a video playing task from the mobile phone to the TV for implementation.

However, the mobile phone can select only one device for one playing task. In other words, the mobile phone can hand over a function that is currently to be implemented, for example, video playing, to only one device connected to the mobile phone for implementation.

SUMMARY

Embodiments of this application provide a device capability scheduling method and an electronic device, to resolve a problem that a mobile phone can hand over a function that currently needs to be implemented, for example, video playing, to only one device connected to the mobile phone for implementation.

To achieve the foregoing technical objective, the following technical solutions are used in embodiments of this application.

According to a first aspect, this application provides a device capability scheduling method, including: A first electronic device displays an interface of a first function, where the first function includes a first sub-function and a second sub-function, and the first sub-function is different from the second sub-function. The first electronic device detects a first operation of a user. The first electronic device displays a first interface in response to the first operation, where the first interface includes a name of the first sub-function, a device identifier of a second electronic device corresponding to the first sub-function, a name of the second sub-function, and a device identifier of a third electronic device corresponding to the second sub-function, and the first electronic device, the second electronic device, and the third electronic device are in a same local area network. If the first electronic device detects a second operation of the user, the first electronic device sends data corresponding to the first sub-function to the second electronic device in response to the second operation, so that the second electronic device executes the first sub-function.

When the first electronic device displays the interface of the first function, the first function may not run. For example, the first function is a video call function, the interface of the first function is an incoming video call notification interface, and a video call is not made. Alternatively, when the first electronic device displays the interface of the first function, the first function is already running. For example, the first function is a video playing function, and the interface of the first function is a video playing interface. In this case, the video is being played.

According to the technical solution, the first electronic device may schedule other electronic devices to implement a sub-function in a currently implemented function, so that a plurality of electronic devices can cooperate to implement the function. That is, the first electronic device may schedule a plurality of electronic devices, so that each electronic device can execute a different sub-function, and the plurality of different electronic devices cooperatively implement one function. This resolves a problem that an electronic device can hand over a function that currently needs to be implemented, for example, a video playing function, to only one device connected to the device for implementation, so that a plurality of electronic devices can execute different sub-functions, to bring better user experience.

In a possible implementation, the first interface may further include a device identifier of the first electronic device corresponding to the second sub-function. After the first electronic device displays the first interface, the method may further include: The first electronic device detects a third operation of the user on the device identifier of the first electronic device. The first electronic device executes the second sub-function in response to the third operation. In other words, the first electronic device may further schedule the first electronic device to implement a sub-function in the first function.

In another possible implementation, the first interface may further include an identifier of a first application and an identifier of a second application that correspond to the device identifier of the second electronic device, and the first application and the second application are installed on the second electronic device. The second operation in the foregoing method may be specifically a second operation on the identifier of the first application. The first electronic device sends the identifier of the first application to the second electronic device in response to the second operation, so that the second electronic device executes the first sub-function by using the first application.

It may be understood that a plurality of applications on the second electronic device may execute the first sub-function. If the first interface includes application identifiers corresponding to the device identifier of the second electronic device, the second operation may be a second operation of the user on an application identifier, so that the first electronic device can determine, based on the second operation, an application that executes the first sub-function on the second electronic device, and the first electronic device can schedule the application on the second electronic device to execute the first sub-function, to further improve user experience.

In another possible implementation, the second operation in the foregoing method may be specifically a selection operation on the device identifier of the second electronic device.

In another possible implementation, the first electronic device stores capability information of the first electronic device. Before the first electronic device displays the first interface, the method further includes: The first electronic device establishes a wireless fidelity (Wi-Fi) connection to the second electronic device, and the first electronic device establishes a Wi-Fi connection to the third electronic device. The first electronic device obtains capability information and the device identifier of the second electronic device, and obtains capability information and the device identifier of the third electronic device. The first electronic device determines, based on the capability information of the second electronic device and the first sub-function, that the first sub-function corresponds to the second electronic device, and determines, based on the capability information of the third electronic device and the second sub-function, that the second sub-function corresponds to the third electronic device.

In another possible implementation, after the first electronic device obtains the capability information and the device identifier of the second electronic device, and obtains the capability information and the device identifier of the third electronic device, the method may further include: The first electronic device stores the capability information of the second electronic device and the device identifier of the second electronic device in an association manner, and stores the capability information of the third electronic device and the device identifier of the third electronic device in an association manner. The capability information includes a capability action of a capability, and the capability action is used to describe a capability of a device. The first electronic device determines a capability for implementing the first sub-function and a capability for implementing the second sub-function. The first electronic device determines, based on stored capability actions of capabilities of the devices and the capabilities for implementing the first sub-function and the second sub-function, a device that can implement the first sub-function and a device that can implement the second sub-function. That the first electronic device displays the first interface includes: The first electronic device displays the first interface based on the device that can implement the first sub-function and the device that can implement the second sub-function.

That is, before the first electronic device displays the first interface, the first electronic device already stores capability information and a device identifier of each electronic device that is in a same local area network as the first electronic device. In this way, the first electronic device may determine a device that can execute each sub-function in the local area network, to display the first interface, so that the user performs a corresponding operation on the first interface based on a requirement, to improve user experience.

In another possible implementation, the first function is a video playing function, and the first sub-function and the second sub-function each are one of image playing, audio playing, or decoding; or the first function is a video call function, and the first sub-function and the second sub-function each are one of image displaying, audio playing, audio recording, or image capturing.

It should be noted that the first function and the sub-functions in the first function are merely examples herein, and are not limited to the foregoing examples.

In another possible implementation, the first operation is a tap operation of the user on a first button for enabling the first function in the interface of the first function; or the first operation is a tap operation of the user on a second button in a notification menu bar, and the notification menu bar is displayed and superimposed on the interface of the first function.

In another possible implementation, the capability information further includes a capability service, and different sub-functions are implemented by scheduling different capability services. That the first electronic device sends data corresponding to the first sub-function to the second electronic device, so that the second electronic device executes the first sub-function includes: The first electronic device schedules a capability service of the second electronic device, and sends the data corresponding to the first sub-function to the second electronic device, so that the second electronic device runs the capability service based on the data corresponding to the first sub-function, and executes the first sub-function. The capability information of the first electronic device is preconfigured in the first electronic device, or is generated and stored based on hardware of the first electronic device.

In another possible implementation, the capability information further includes an identifier of an application that can schedule the capability described by the capability action, and different sub-functions are implemented by scheduling different applications. That the first electronic device sends data corresponding to the first sub-function to the second electronic device, so that the second electronic device executes the first sub-function includes: The first electronic device schedules an application on the second electronic device, and sends the data corresponding to the first sub-function to the second electronic device, so that the second electronic device executes the first sub-function based on the data corresponding to the first sub-function by using the application.

In another possible implementation, the first electronic device stores an installation description of an application on the first electronic device, and the installation description includes a handle of the application and a capability that is of the first electronic device and that can be scheduled by the application. The method further includes: The first electronic device generates and stores the capability information of the first electronic device based on the installation description, where an application identifier in the capability information is a handle.

According to a second aspect, this application further provides a device capability scheduling method, including: A second electronic device receives a message sent by a first electronic device to request to execute a first sub-function. The second electronic device displays a second interface, where the second interface includes an identifier of a first application corresponding to the first sub-function and an identifier of a second application corresponding to the first sub-function. The second electronic device receives a third operation of a user on the identifier of the first application. In response to the third operation, the second electronic device schedules the first application to execute the first sub-function.

The first sub-function is a part of a first function. The first function is a video playing function, and the first sub-function is one of image playing, audio playing, or decoding; or the first function is a video call function, and the first sub-function is one of image displaying, audio playing, audio recording, or image capturing.

For example, the first function is the video playing function, and sub-functions in the first function are audio playing, image playing, and decoding. For example, the first sub-function is the image playing. It is assumed that the second electronic device is a TV, and the TV includes a first video application and a second video application. In response to a second operation, the first electronic device sends a message used to request to implement an image playing sub-function to the IV and the TV displays the second interface. The second interface includes an identifier of the first video application and an identifier of the second video application. If the user wants to choose the first video application to play an image, the user may perform the third operation on the identifier of the first video application in the second interface. In this case, the TV may receive the third operation of the user on the identifier of the first video application. In response to the third operation, the TV schedules the first video application, and runs the first video application to execute the image playing sub-function.

It should be noted that the second interface may also be displayed on the first electronic device, and the first electronic device may receive a selection operation of the user on an application identifier in the second interface, so that the first electronic device can determine an application that the user wants to schedule on the second electronic device, to improve user experience.

According to a third aspect, this application provides an electronic device. The electronic device includes a memory and one or more processors. The memory is coupled to the one or more processors. The memory is configured to store program code. When the one or more processors execute the program code, the electronic device performs the method in any possible implementation of the first aspect.

According to a fourth aspect, this application further provides an electronic device. The electronic device includes a memory and one or more processors. The memory is coupled to the one or more processors. The memory is configured to store program code. When the one or more processors execute the program code, the electronic device performs the method in the implementation of the second aspect.

According to a fifth aspect, embodiments of this application provide a computer storage medium, including program code. When the program code is run on an electronic device, the electronic device is enabled to perform the method in any one of the first aspect and the possible implementations of the first aspect.

According to a sixth aspect, embodiments of this application provide a computer program product. When the computer program product is run on a computer, the computer is enabled to perform the method in any one of the first aspect and the possible implementations of the first aspect.

According to a seventh aspect, embodiments of this application provide a computer storage medium, including program code. When the program code is run on an electronic device, the electronic device is enabled to perform the method in the implementation of in the second aspect.

According to an eighth aspect, embodiments of this application provide a computer program product. When the computer program product is run on a computer, the computer is enabled to perform the method in the implementation of the second aspect.

It may be understood that for beneficial effects that can be achieved by the electronic device according to the third aspect, the fourth aspect, and the possible implementations of the third aspect and the fourth aspect, the computer storage medium according to the fifth aspect or the seventh aspect, or the computer program product according to the sixth aspect or the eighth aspect, refer to beneficial effects in the first aspect and any possible implementation of the first aspect. Details are not described herein again.

BRIEF DESCRIPTION OF DRAWINGS

FIG. 3B-1 and FIG. 3B-2 are a schematic diagram of a device architecture according to an embodiment of this application;

DESCRIPTION OF EMBODIMENTS

Figure 1:
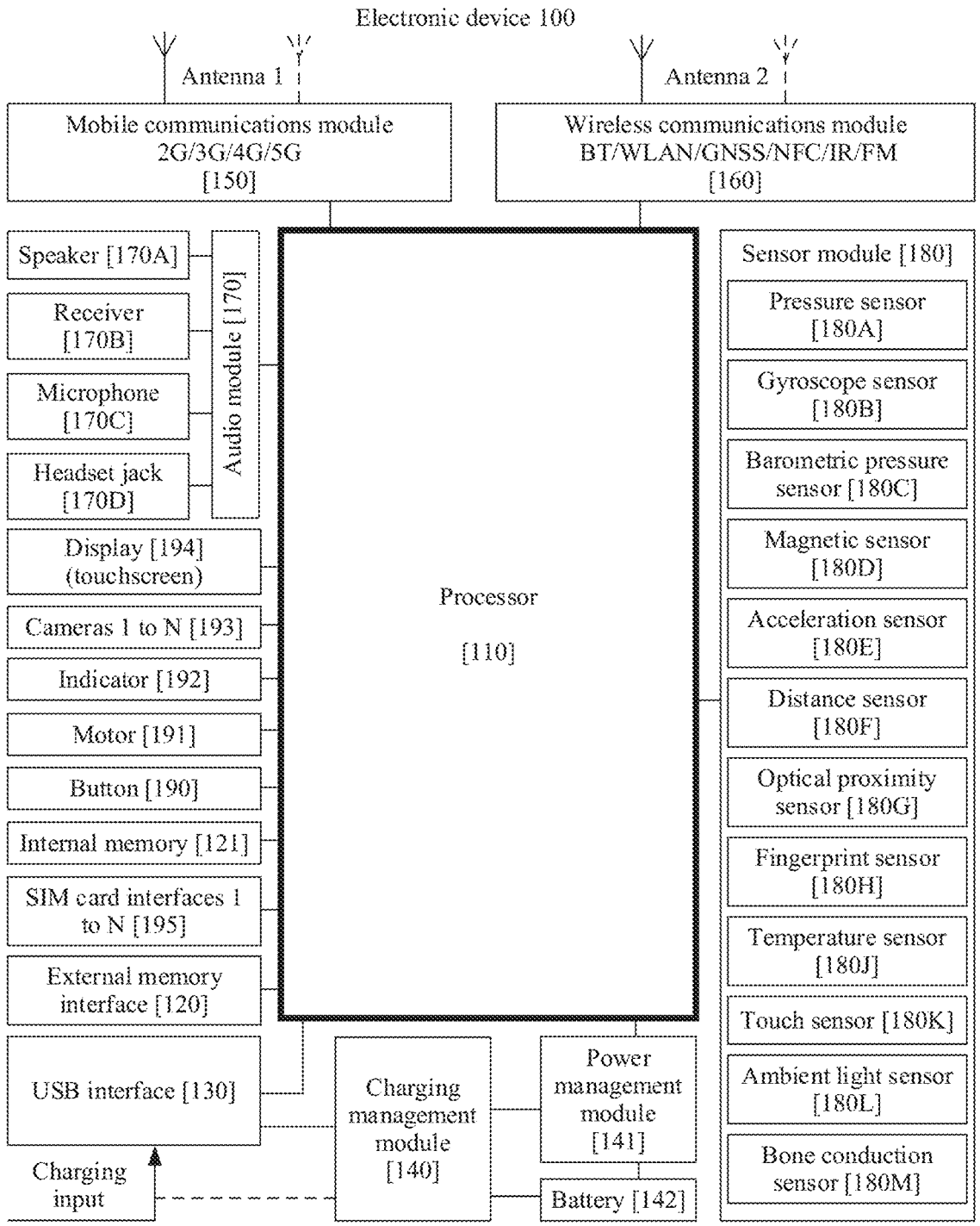
FIG. 1 is a schematic diagram of a hardware structure of an electronic device according to an embodiment of this application.

Terms "first" and "second" below are merely used for description, and shall not be understood as an indication or implication of relative importance or implicit indication of a quantity of indicated technical features. Therefore, a feature limited by "first" or "second" may explicitly or implicitly include one or more features. In the descriptions of the embodiments, unless otherwise specified, "a plurality of" means two or more than two.

An electronic device may implement a plurality of functions. The functions are functions that can be provided by the electronic device, and may be implemented by the electronic device by scheduling corresponding capabilities. Specifically, a function of the electronic device may be implemented by the electronic device by scheduling a software module and a hardware module that have a corresponding capability. For example, a plurality of applications are installed on the electronic device. In an application running process, the electronic device may implement a function by scheduling, based on the function that needs to be implemented by the applications, a software module (for example, a capability service) of a corresponding capability and a hardware module of the capability. For example, an application is a video application. A video playing function of the video application on the electronic device may be implemented by scheduling a capability service and a hardware module of a corresponding capability of the device. One function that needs to be implemented by the application may need to be implemented by scheduling capability services and hardware modules of a plurality of capabilities of the device. The video application is still used as an example. The video playing function of the video application may be divided into a plurality of sub-functions: decoding, audio playing, and image playing. Different sub-functions may be implemented by scheduling capability services and hardware modules of different capabilities of the device. Specifically, the electronic device may implement a decoding function by scheduling a capability service of a decoding capability of the electronic device and a hardware module configured to implement decoding, play a sound by scheduling a capability service of an audio playing capability of the electronic device and a loudspeaker, and play an image by scheduling a capability service of an image playing capability of the electronic device and a display, to play a video.

It may be understood that the electronic device may have at least one capability, and the electronic device may schedule capability services and hardware modules of different capabilities to implement different functions. Different electronic devices have different capabilities. For example, a mobile phone has capabilities: audio playing, image playing, photo displaying, distance measurement, audio recording, image capturing, and photo capturing. A TV has capabilities: audio playing, image playing, and the like. A speaker has a capability: audio playing.

In some scenarios, a user may need to use capabilities of a plurality of electronic devices. To meet a requirement of the user for simultaneously using capabilities of a plurality of electronic devices, embodiments of this application provide a device capability scheduling method. The method is applied to a device group, and all electronic devices in the device group are in a same local area network. Each device in the device group may have a different capability. Any device in the device group may schedule a capability service and a hardware module corresponding to a capability of another device in the device group, to implement a corresponding function.

For example, in a process in which a first electronic device in the device group runs a first application, the first application on the first electronic device needs to implement a function (or a task). This function may be divided into a plurality of sub-functions (or sub-tasks). The first electronic device may schedule different electronic devices in the device group to implement different sub-functions of the function, so as to cooperatively implement the function. For example, a mobile phone, a TV, and a speaker are in a same local area network. When a video application on the mobile phone plays a video, the mobile phone may implement decoding by scheduling a capability service of a decoding capability of the mobile phone and a hardware module configured to implement decoding, may further play an image by scheduling a capability service of an image playing capability of the TV and a display, and play a sound by scheduling an audio playing capability service of the speaker and a loudspeaker, to cooperatively implement a video playing function of the video application on the mobile phone.

In this way, the first electronic device may schedule a plurality of different electronic devices in the device group to cooperatively implement a function of the first electronic device. In this way, "features" of the electronic devices in the device group are brought into play, to bring better user experience.

It should be understood that the electronic devices in the device group may be interconnected through wireless broadband (Wi-Fi Alliance, Wi-Fi), Bluetooth, a ZigBee network, or the like, to form a local area network. For example, a device group includes electronic devices: a mobile phone, a TV, a speaker, and a tablet computer. The user may connect all the mobile phone, the TV, the speaker, and the tablet computer to a same Wi-Fi access point. All devices connected to the same Wi-Fi access point form a device group. Alternatively, the mobile phone may serve as a Wi-Fi access point, all the tablet computer, the speaker, and the TV may be connected to the Wi-Fi access point, and the devices connected to the Wi-Fi access point and the mobile phone form a device group.

For example, the electronic device in the device group in embodiments of this application may be a mobile phone, a tablet computer, a desktop computer, a laptop computer, a handheld computer, a notebook computer, an ultra-mobile personal computer (ultra-mobile personal computer, UMPC), a netbook, and a device such as a cellular phone, a personal digital assistant (personal digital assistant, PDA), or an augmented reality (augmented reality, AR) device/a virtual reality (virtual reality, VR) device A specific form of the electronic device is not specifically limited in embodiments of this application.

The following describes in detail implementations in embodiments of this application with reference to accompanying drawings. FIG. 1 is a schematic diagram of a structure of an electronic device 100 according to an embodiment of this application. As shown in FIG. 1, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an at audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like.

The sensor module 180 may include sensors such as a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180I, and a bone conduction sensor 180M.

It may be understood that the structure shown in embodiments does not constitute a specific limitation on the electronic device 100. In some other embodiments, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the electronic device 100. The controller may generate an operation control signal based on an instruction operation code and a time sequence signal, to control to read instructions and execute instructions.

A memory may be further disposed in the processor 110, and is configured to store instructions and data. In some embodiments, the memory in the processor 110 is a cache. The memory may store instructions or data that has just been used or is cyclically used by the processor 110. If the processor 110 needs to use the instructions or the data again, the processor may directly invoke the instructions or the data from the memory. This avoids repeated access and reduces waiting time of the processor 110. Therefore, system efficiency is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules shown in embodiments of the present invention is merely used as an example for description, and does not constitute a limitation on the structure of the electronic device 100. In some other embodiments, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments in which wired charging is used, the charging management module 140 may receive a charging input from the wired charger through the USB interface 130. In some embodiments in which wireless charging is used, the charging management module 140 may receive a wireless charging input through a wireless charging coil of the electronic device 100. The charging management module 140 may further supply power to the electronic device by using the power management module 141 when the battery 142 is charged.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like.

A wireless communications function of the electronic device 100 may be implemented by using the antenna 1, the antenna 2, the mobile communications module 150, the wireless communications module 160, the modem processor, the baseband processor, and the like.

The antenna 1 and the antenna 2 each are configured to transmit and receive electromagnetic wave signals. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communications module 150 may provide a solution that is for wireless communication including 2G/3G/4G/5G and the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transfer a processed electromagnetic wave to the modem processor for demodulation.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same device as the mobile communications module 150 or another function module.

The wireless communications module 160 may provide a wireless communication solution that is applied to the electronic device 100 and that includes wireless local area networks (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, and an infrared (infrared, IR) technology.

The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert, the signal into an electromagnetic wave for radiation through the antenna 2.

The electronic device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPlJs that execute program instructions to generate or change display information.

The display 194 is configured to display an image, a video, and the like. The display 194 includes a display panel. Specifically, the display panel may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a mini-LED, a micro-LED, a micro-OLED, quantum dot light emitting diodes (quantum dot light emitting diodes, QLED), or the like.

The electronic device 100 may implement a photographing function by using the ISP, the camera 193, the video codec, the GPU, the display 194, the application processor, and the like.

The ISP is configured to process data fed back by the camera 193, For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to: compress or decompress a digital video. The electronic device 100 may support one or more video codecs. In this way, the electronic device 100 can play or record videos in a plurality of coding formats, for example, moving picture experts group (moving picture experts group, MPEG)-1, MPEG-2, MPEG-3, and MPEG-4.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The processor 110 runs the instructions stored in the internal memory 121 to perform various function applications of the electronic device 100 and process data. For example, in this embodiment of this application, the processor 110 may execute the instructions stored in the internal memory 121, and the internal memory 121 may include a program storage area and a data storage area.

The program storage area may store an operating system, an application required by at least one function (for example, a sound play function or an image play function), and the like. The data storage area may store data (for example, audio data and an address book) and the like created when the electronic device 100 is used. In addition, the internal memory 121 may include a high-speed random access memory, or may include a nonvolatile memory, for example, at least one magnetic disk storage device, a flash memory, or a universal flash storage (universal flash storage, UFS).

The electronic device 100 may implement audio functions such as music playing and audio recording functions by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. The speaker 170A, also referred to as a "loudspeaker", is configured to convert an audio electrical signal into a sound signal. The receiver 170B, also referred to as an "earpiece", is configured to convert an audio electrical signal into a sound signal. The microphone 170C, also referred to as a "mike" or a "mic", is configured to convert a sound signal into an electrical signal.

The headset jack 170D is configured to connect to a wired headset. The headset jack 170D may be a USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194.

The gyroscope sensor 180B may be configured to determine a motion posture of the electronic device 100. The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall effect sensor. The electronic device 100 may detect opening and closing of a flip cover by using the magnetic sensor 180D.

The acceleration sensor 180E may detect accelerations in various directions (usually on three axes) of the electronic device 100, and may detect magnitude and a direction of gravity when the electronic device 100 is still. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. The optical proximity sensor 180G may include, for example, a light emitting diode (LED) and an optical detector.

The ambient light sensor 180L is configured to sense ambient light brightness.

The fingerprint sensor 180H is configured to collect a fingerprint.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of a processor near the temperature sensor 180J, to reduce power consumption for thermal protection.

The touch sensor 180K is alternatively referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor, to determine a type of a touch event. A visual output related to the touch operation may be provided on the display 194. In some other embodiments, the touch sensor 180K may alternatively be disposed on a surface of the electronic device 100 in a position different from that of the display 194.

In embodiments of this application, the electronic device 100 may detect, by using the touch sensor 180K, a touch operation entered by a user on the touchscreen, and collect one or more of a touch location, a touch area, a touch direction, touch time, and the like of the touch operation on the touchscreen. In some embodiments, the electronic device 100 may determine a touch position of the touch operation on the touchscreen by using both the touch sensor 180K and the pressure sensor 180A.

The button 190 includes a power button, a volume button, and the like. The button 190 may be a mechanical button, or may be a touch-sensitive button. The electronic device 100 may receive a button input, and generate a button signal input related to user setting and function control of the electronic device 100.

The motor 191 may generate a vibration prompt. The motor 191 may be configured to produce an incoming call vibration prompt and a touch vibration feedback.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100, The electronic device 100 may support one or N SIM card interfaces, where N is a positive integer greater than 1. The SIM card interface 195 can support a nano-SIM card, a micro-SIM card, a SIM card, and the like.

A software system of the electronic device 100 may use a layered architecture, an event-driven architecture, a microkernel architecture, a micro service architecture, or a cloud architecture. In an embodiment of this application, an Android system with a layered architecture is used as an example to describe a software structure of the electronic device 100.

Figure 2:
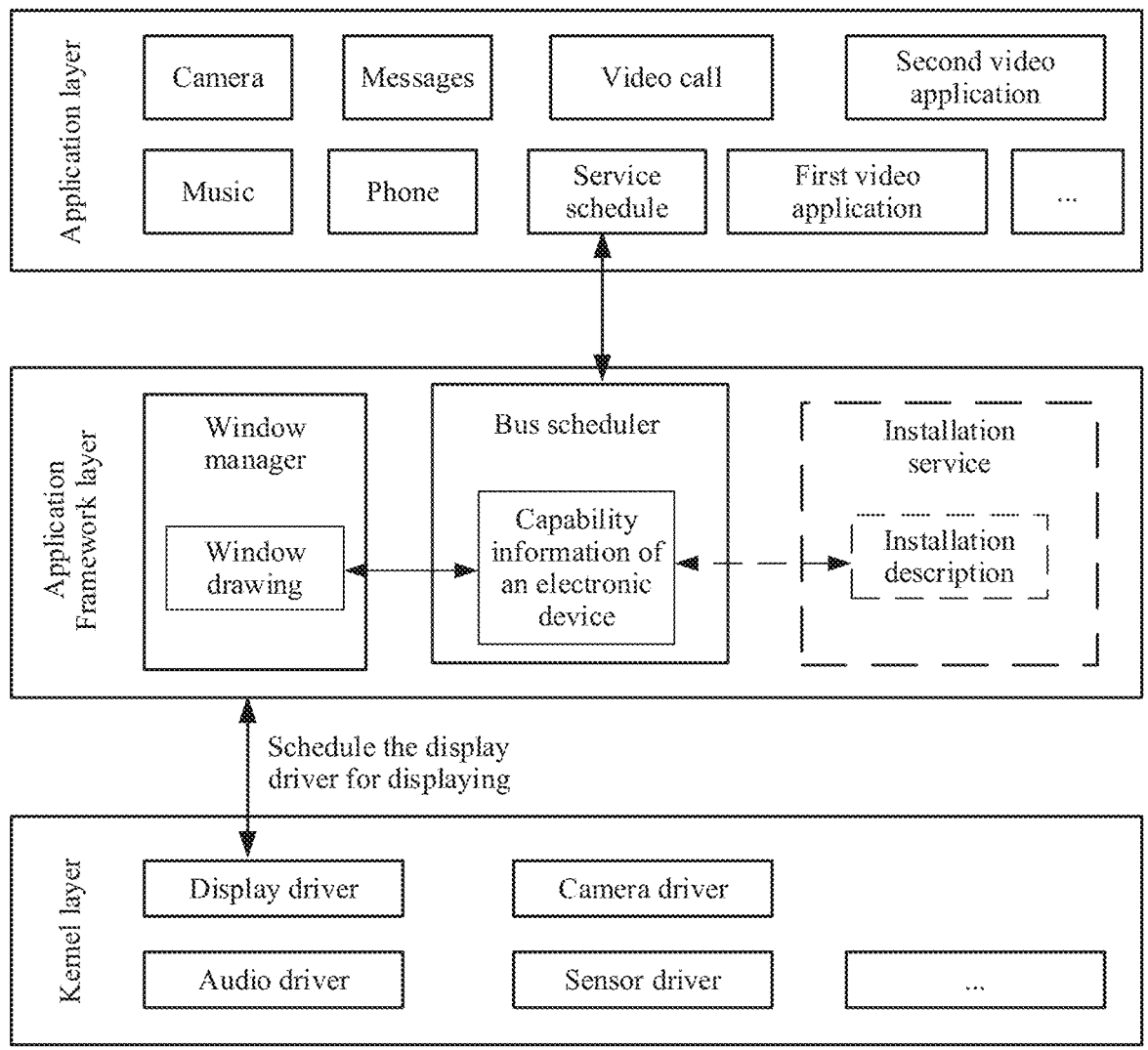
FIG. 2 is a diagram of a software architecture of an electronic device according to an embodiment of this application.

FIG. 2 is a block diagram of the software structure of the electronic device 100 according to this embodiment of this application. In a layered architecture, software may be divided into several layers, each of which is assigned a clear role and task. The layers communicate with each other through a software interface. In some embodiments, the Android system is divided into three layers: an application program layer (application layer for short), an application framework layer (framework layer for short), and a kernel layer (also referred to as a driver layer) from top to bottom.

The application layer may include a series of application packages. For example, as shown in FIG. 2, the application packages may be an application program such as Camera, Messages, Music, Phone, Video call, a first video application, a second video application, or Service schedule.

The framework layer provides an application programming interface (application programming interface, API) and a programming framework for application programs at the application layer. The application framework layer includes some predefined functions. As shown in FIG. 2, the framework layer includes a window manager (window manager service, WMS), a bus scheduler, and the like. Optionally, the framework layer may further include a content manager, a phone manager, a resource manager, a notification manager, and the like (not shown in the figure).

The window manager is configured to manage a window program. The window manager may obtain a size of the display, determine whether there is a status bar, lock a screen, take a screenshot, and the like.

The bus scheduler is configured to store capability information of a capability of the electronic device. In some embodiments, the capability information includes a capability action (Action) and a capability service (Service), and one capability action corresponds to one capability service. Different capability information corresponds to different capabilities of the electronic device. In some other embodiments, the capability information includes a capability action (Action) and an identifier of an application that is on the electronic device and that can schedule the capability, and one capability action may correspond to identifiers of one or more applications. The bus scheduler further stores a device identifier of the electronic device, the device identifier is used to identify the electronic device.

For example, the capability information stored in the bus scheduler may include capability information of an image playing capability, capability information of a photo display capability, capability information of an audio playing capability, capability information of an image capture capability, the capability information of the audio playing capability, capability information of an audio recording capability, and the like.

In an application scenario, when "Service schedule" at the application layer runs, "Service schedule" may access the capability information and the device identifier of the electronic device that are stored in the bus scheduler.

Further, the framework layer may further include an installation service. The installation service is used to store and obtain data and make the data accessible. The data includes an installation description of each application, and each application installed on the electronic device needs to write the installation description into the installation service. The installation description is a handle of the application and a capability that is of the electronic device and that is scheduled by the application. It should be noted that the handle is a special smart pointer. When the electronic device schedules a capability of another electronic device to implement a corresponding function, the handle may be used to schedule a memory block or an object managed by the another electronic device, so that the another electronic device implements the function.

In some embodiments of this application, in an implementation in which the capability information includes a capability action (Action) and an identifier of an application that is on the electronic device and that can schedule the capability, identifiers that are of applications that can use different capabilities and that are included in the capability information may be obtained by the bus scheduler. For example, the bus scheduler may obtain an installation description of each application in the installation service, determine, based on the installation description of each application, a capability that can be scheduled by each application, to obtain capabilities of the electronic device, and generate a capability action (Action) of each capability of the electronic device and an identifier of an application that can schedule the capability. One capability corresponds to one capability action (Action), one capability may correspond to at least one identifier, and the identifier may be a handle of an application.

It should be noted that, when the electronic device and at least one another electronic device are in a same local area network, if the another electronic device is also provided with a bus scheduler, the bus scheduler of the electronic device may share information with the bus scheduler of the another electronic device in the same local area network. Therefore, a bus scheduler of each electronic device in a same local area network may obtain and store capability information of all electronic devices in the local area network. For example, device identifiers of different electronic devices and capability information of the different electronic devices may be stored in an associated manner.

The kernel layer is a layer between hardware and software. The kernel layer includes at least a display driver, a camera driver, an audio driver, a sensor driver, and the like.

Figure 3A:
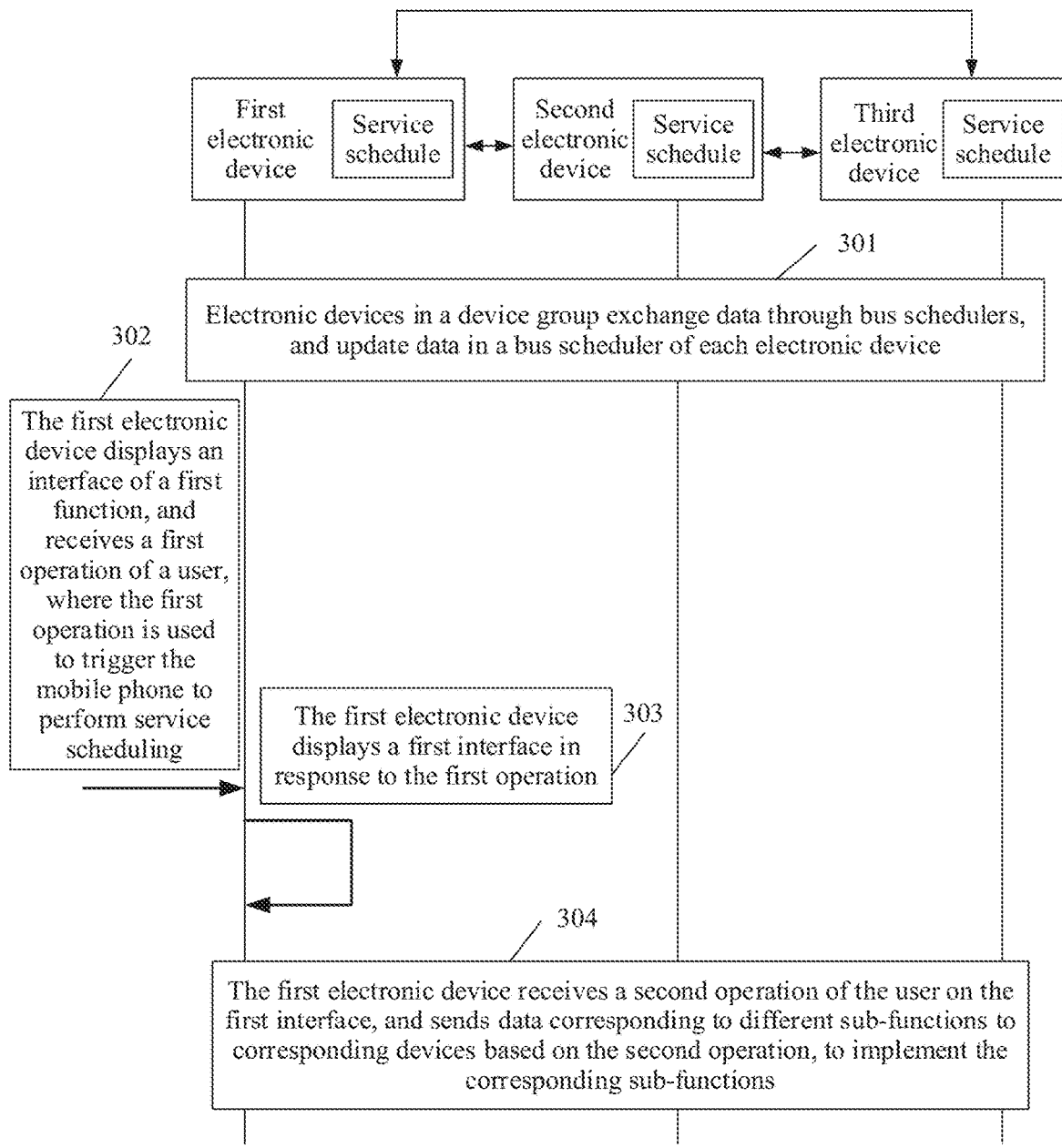
FIG. 3A is a flowchart of a device capability scheduling method according to an embodiment of this application.

Embodiments of this application provide a device capability scheduling method. The method is applied to a device group. FIG. 3A is a schematic flowchart of a device capability scheduling method according to an embodiment of this application. In this embodiment, an example in which the device group includes a first electronic device, a second electronic device, and a third electronic device is used. For example, the first electronic device, the second electronic device, and the third electronic device may access same Wi-Fi.

Figures 1, 3B:
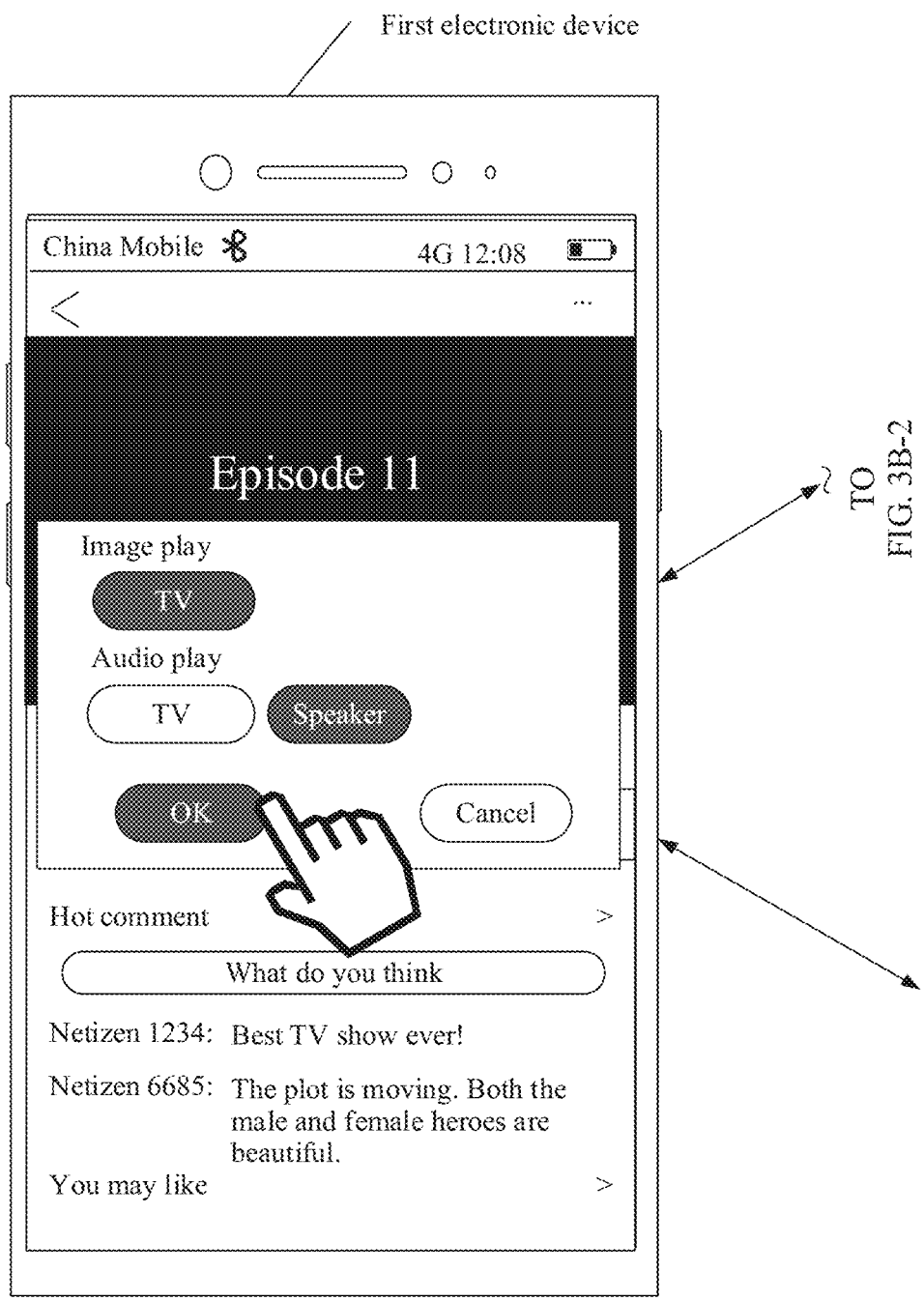
Figure 3B:
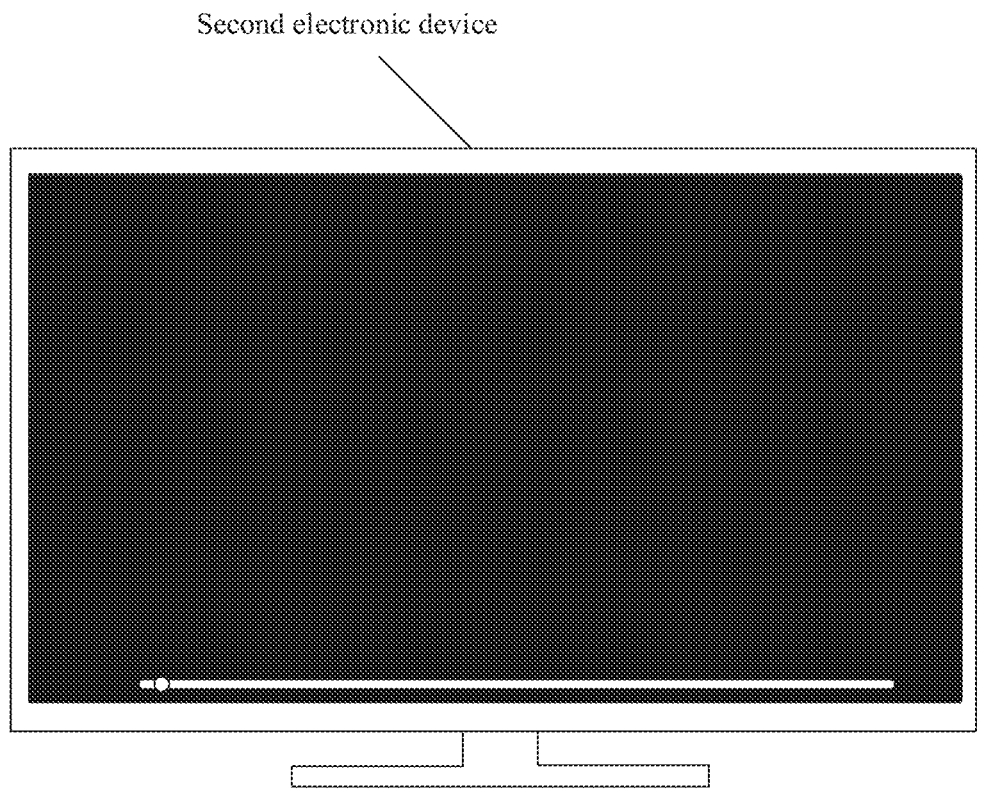
Figure 2:
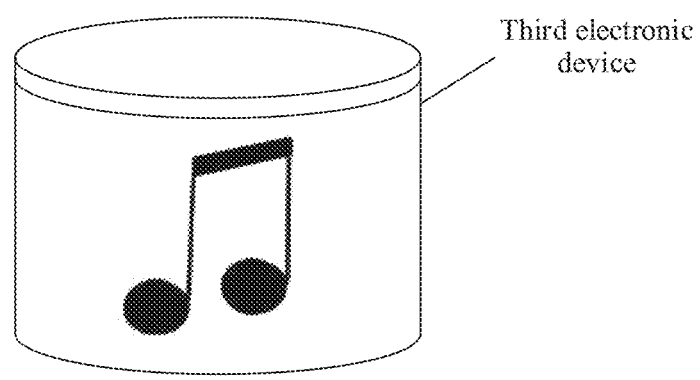

FIG. 3B-1 and FIG. 3B-2 are a schematic diagram of composition of a device group according to an embodiment of this application. FIG. 3B-1 and FIG. 3B-2 show an example in which the device group includes the first electronic device, the second electronic device, and the third electronic device, the first electronic device is a mobile phone, the second electronic device is a TV, and the third electronic device is a speaker.

In this embodiment of this application, electronic devices in a device group in a same local area network may schedule capabilities of each other, to cooperate to complete corresponding functions. For example, with reference to FIG. 3B-1 and FIG. 3B-2, the mobile phone may schedule a corresponding capability of the TV to implement an image playing function, and the mobile phone may further schedule a corresponding capability of the speaker to implement an audio playing function. The following describes this embodiment of this application in detail with reference to FIG. 2 and FIG. 3B-1 and FIG. 3B-2.

Step 301: Electronic devices in a device group exchange data through bus schedulers, and update data in a bus scheduler of each electronic device.

All electronic devices in a device group in a same local area network may share data through respective bus schedulers based on a connection to another electronic device, so that each electronic device in the device group can obtain capability information of the another electronic device.

In this embodiment of this application, a bus scheduler of an electronic device stores capability information of a capability of the electronic device. For example, the electronic device is the first electronic device in the foregoing device group, that is, the mobile phone. The mobile phone has the following capabilities: photo displaying, audio playing, image playing, photo capturing, image capturing, audio recording, distance measurement, and the like. A bus scheduler of the mobile phone stores capability information corresponding to the capabilities.

In a first implementation, the capability information of the capabilities of the first electronic device may be preconfigured in the first electronic device. For example, the capability information of the capabilities of the mobile phone may be preconfigured in a memory of the mobile phone. When the mobile phone is powered on and runs for the first time, the bus scheduler of the mobile phone exchanges information with the memory of the mobile phone, to register the capability information of the capabilities of the mobile phone with the bus scheduler. For another example, the capability information of the capabilities of the mobile phone may also be preconfigured in the bus scheduler of the mobile phone before delivery. As software in the mobile phone is updated (for example, an application is downloaded or deleted, or an operating system is updated), the capability information may be further updated.

In this implementation, the capability information may include a capability action (Action) and a capability service (Service), and one capability action corresponds to one capability service. The capability action is configured in the mobile phone based on hardware of the mobile phone, and is used to indicate (or describe) a capability of the mobile phone. The capability service is a software module scheduled by the electronic device to implement a function corresponding to the capability. For example, the hardware of the mobile phone may include a display, a loudspeaker, a microphone, a camera, and a distance sensor. The capability action in the capability information of the mobile phone may indicate that the mobile phone has the following capabilities: a photo display capability, an image playing capability, an audio playing capability, an audio recording capability, a photo capture capability, an image capture capability, a distance measurement capability, and the like. Each capability indicated by the capability action may correspond to one capability service.

For example, the capability information stored in the bus scheduler of the mobile phone includes capability information of the photo display capability. A capability action (Action) in the capability information of the capability may be defined as: DEVICE_DISPLAY_PHOTO, and a capability service (Service) may be defined as: display Photo Service. The display Photo Service is a software module configured to display a photo. The capability information further includes capability information of the image playing capability. A capability action of the capability may be defined as: DEVICE_DISPLAY_IMAGE, and a capability service may be defined as: display image Service. The display image Service is a software module used to play an image. The capability information further includes capability information of the audio playing capability A capability action of the capability may be defined as: DEVICE_PLAY_AUDIO, and a capability service may be defined as: play audio Service. The play audio Service is a software module configured to play audio. The capability information further includes capability information of the distance measurement capability. A capability action of the capability may be defined as: DEVICE_DISTANCE_SENSOR, and a capability service may be defined as: distance sensor Service. The distance sensor Service is a software module configured to implement a distance measurement function. The capability information further includes capability information of the decoding capability. A capability action of the capability may be defined as: DEVICE_DECODE, and a capability service may be defined as: decode Service. The decode Service is a software module configured to implement a decoding function.

In a second implementation, the first electronic device may determine the capability information of the capabilities of the first electronic device based on applications installed on the first electronic device, and store the capability information in the bus scheduler of the electronic device. For example, the mobile phone may determine, based on an installation description of each application, a capability that can be scheduled by each application, to obtain the capabilities of the mobile phone, and generate a capability action of each capability of the mobile phone and an identifier of an application that can schedule the capability. The identifier of the application may be a handle.

It should be noted that each application installed on the mobile phone needs to write an installation description into an installation service. The installation description is a description of an installed application. The installation description includes a type of the application, a handle of the application, and a capability that is of the mobile phone and that is scheduled by the application in a running process. For example, the following applications are installed on the electronic device: Video call, a first video application, and a second video application. For example, an installation description of Video call is: a video communication application, a handle of Video call, and capabilities that are of the mobile phone and that are scheduled by the application in a running process: the image playing capability, the audio playing capability, the audio recording capability, and the image capture capability. An installation description of the first video application is: a video application, a handle of the first video application, and capabilities that are of the mobile phone and that are scheduled by the first video application in a running process: the image playing capability, a video file decoding capability, and the audio playing capability. An installation description of the second video application is: a video application, a handle of the second video application, and capabilities that are of the mobile phone and that are scheduled by the second video application in a running process: the image playing capability, the video file decoding capability, and the audio playing capability.

For example, based on the foregoing installation description, it may be determined that the capabilities of the mobile phone include: the image playing capability, the video file decoding capability, the audio playing capability, the audio recording capability, and the image capture capability. A capability action of each capability may be generated based on the capabilities of the mobile phone, for example, including image displaying, video file decoding, audio playing, audio recording, and image capturing. An example in which an identifier of an application is a handle of the application is used. Application identifiers corresponding to capability actions are as follows: Identifiers corresponding to image playing are a handle of the first video application, a handle of the second video application, and a handle of Video call. Identifiers corresponding to video file decoding are the handle of the first video application and the handle of the second video application. Identifiers corresponding to audio playing are the handle of the first video application, the handle of the second video application, and the handle of Video call. An identifier corresponding to the audio recording is the handle of Video call. An identifier corresponding to the image capturing is the handle of Video call.

It may be understood that, because a plurality of applications may be installed on the first electronic device, one capability may correspond to more than one application identifier. The second electronic device or the third electronic device may schedule the first electronic device, to use a capability of the first electronic device. Therefore, when scheduling the capability of the first electronic device, the second electronic device or the third electronic device may schedule an application corresponding to any application identifier in application identifiers corresponding to the capability, so that the application corresponding to the application identifier runs on the first electronic device, to implement a corresponding function. For example, when the application is running, a software module (for example, a capability service) and a hardware module of a corresponding capability may be scheduled to implement a corresponding function.

For example, the second electronic device implements a video playing function, and the video playing function includes an image playing sub-function. The second electronic device may schedule a corresponding application on the first electronic device to implement the image playing sub-function. For example, the second electronic device may select to schedule the first video application on the first electronic device, so that the first video application runs. When the first video application is running, a software module and a hardware module (such as a display) of the video playing capability of the first electronic device may be scheduled to implement the image playing sub-function. Alternatively, the second electronic device may select to schedule the second video application on the first electronic device, so that the second video application runs. When the second video application is running, a software module and a hardware module (such as the display) of the video playing capability of the first electronic device of the software module may be scheduled to implement the image playing sub-function.

It should be noted that, when determining, based on a capability that can be scheduled by an application, an application identifier corresponding to the capability, the first electronic device needs to determine whether a handle of the application can be scheduled by another device (for example, the second electronic device or the third electronic device). If the handle of the application can be scheduled by another device, the first electronic device may add the handle of the application to the application identifier corresponding to the capability. If the handle of the application refuses to be scheduled by another device, the handle of the application is not added to the application identifier corresponding to the capability. For example, the application is "China Merchants Bank". An installation description of the application is: an online payment platform, a handle of the application, and a capability of the application: online payment. In addition, the handle of the application refuses to be scheduled by another device, and therefore, application identifiers corresponding to the online payment capability in the capability information do not include the handle of "China Merchants Bank".

In this embodiment of this application, the bus scheduler further stores a device identifier of the electronic device. That the electronic devices in the device group exchange data through the bus scheduler further includes: The first electronic device sends a device identifier to the second electronic device and the third electronic device in the device group, and the first electronic device obtains a device identifier of the second electronic device and a device identifier of the third electronic device. In the bus scheduler, a device identifier and capability information of a capability of an electronic device corresponding to the device identifier may be stored in an associated manner. When scheduling the second electronic device or the third electronic device, the first electronic device may display the device identifier, so that a user can determine, based on the device identifier, an electronic device that the user wants to schedule.

For example, the first implementation is used as an example, the capability information of the first electronic device includes a capability action and a capability service. It is assumed that the first electronic device has the following capabilities: the photo display capability, the audio playing capability, an image playing capability, the photo capture capability, the image capture capability, the audio recording capability, and the distance measurement capability. In this case, the bus scheduler of the first electronic device may store the capability information shown in Table 1.

TABLE 1

| Capability information table in the first electronic device | |
| --- | --- |
| Capability action | Capability service |
| Capability action of the photo display capability | Capability service of the photo display capability |
| Capability action of the audio playing capability | Capability service of the audio playing capability |
| Capability action of the image playing capability | Capability service of the image playing capability |
| Capability action of the photo capture capability | Capability service of the photo capture capability |
| Capability action of the image capture capability | Capability service of the image capture capability |
| Capability action of the audio recording capability | Capability service of the audio recording capability |
| Capability action of the distance measurement capability | Capability service of the distance measurement capability |

Similarly, the second electronic device may also generate capability information of the second electronic device based on the foregoing description and store the capability information in a bus scheduler of the second electronic device. It is assumed that the second electronic device has the following capabilities: a photo display capability, an image playing capability, and an audio playing capability. The capability information stored in the bus scheduler of the second electronic device includes: capability information of photo displaying, capability information of image playing, and capability information of audio playing. The third electronic device has the following capability: an audio playing capability. Capability information stored in a bus scheduler of the third electronic device includes: capability information of audio playing.

The first electronic device is used as an example. The electronic devices in the device group exchange data through the bus schedulers, and after data in the bus schedule on each electronic device is updated, capability information stored in the bus scheduler of the first electronic device may not only include the capability information of the capabilities of the first electronic device, but also include the capability information of the capabilities of the second electronic device and the third electronic device. The first electronic device may store the capability information of the capabilities of the first electronic device and the device identifier of the first electronic device in an associated manner, store the capability information of the capabilities of the second electronic device and the device identifier of the second electronic device in an associated manner, and store the capability information of the capability of the third electronic device and the device identifier of the third electronic device in an associated manner. For example, the bus scheduler of the first electronic device may store the capability information shown in Table 2.

TABLE 2

| Capability information table after the bus scheduler of the first electronic device performs data exchange | | |
| --- | --- | --- |
| | Capability action | Capability service |
| Device identifier of the first electronic device | Capability action of the photo display capability | Capability service of the photo display capability |
| | Capability action of the audio playing capability | Capability service of the audio playing capability |
| | Capability action of the image playing capability | Capability service of the image playing capability |
| | Capability action of the photo capture capability | Capability service of the photo capture capability |
| | Capability action of the image capture capability | Capability service of the image capture capability |

TABLE 2-continued

Capability information table after the bus scheduler of the first electronic device performs data exchange

|  | Capability action | Capability service |
|---|---|---|
| Device identifier of the second electronic device | Capability action of the audio recording capability | Capability service of the audio recording capability |
|  | Capability action of the distance measurement capability | Capability service of the distance measurement capability |
|  | Capability action of the photo display capability | Capability service of the photo display capability |
|  | Capability action of the audio playing capability | Capability service of the audio playing capability |
|  | Capability action of the image playing capability | Capability service of the image playing capability |
| Device identifier of the third electronic device | Capability action of the audio playing capability | Capability service of the audio playing capability |

Similarly, the second electronic device may also obtain the capability information of the first electronic device and the third electronic device through data sharing by the bus schedulers, and the third electronic device may also obtain the capability information of the first electronic device and the second electronic device through data sharing by the bus schedulers. It should be noted that, if the third electronic device is a speaker, the speaker has only an audio playing capability, and the speaker does not need to schedule a capability of another device. When sharing data with an electronic device in a same local area network through a bus scheduler, the speaker may not obtain data on a bus scheduler of another electronic device.

Step 302: The first electronic device displays an interface of a first function, and receives a first operation of the user. The first operation is used to trigger the mobile phone to perform service scheduling.

The first function may include a plurality of sub-functions, for example, include a first sub-function and a second sub-function. For example, the first function is a video call function, and the video call function may include sub-functions: image displaying, audio playing, audio recording, and image capturing. For another example, the first function is a video playing function, and the video playing function may include sub-functions: image playing, audio playing, and decoding.

For example, the first operation may be a tap operation of the user on a first button for enabling the first function in the interface of the first function.

For example, it is assumed that a function implemented by the mobile phone is video playing. The mobile phone is running a video application, and displays an interface of the video application (the interface of the video application may be the interface of the first function). The first operation may be a tap operation of the user on a "Play" button in a video interface.

Figure 4:
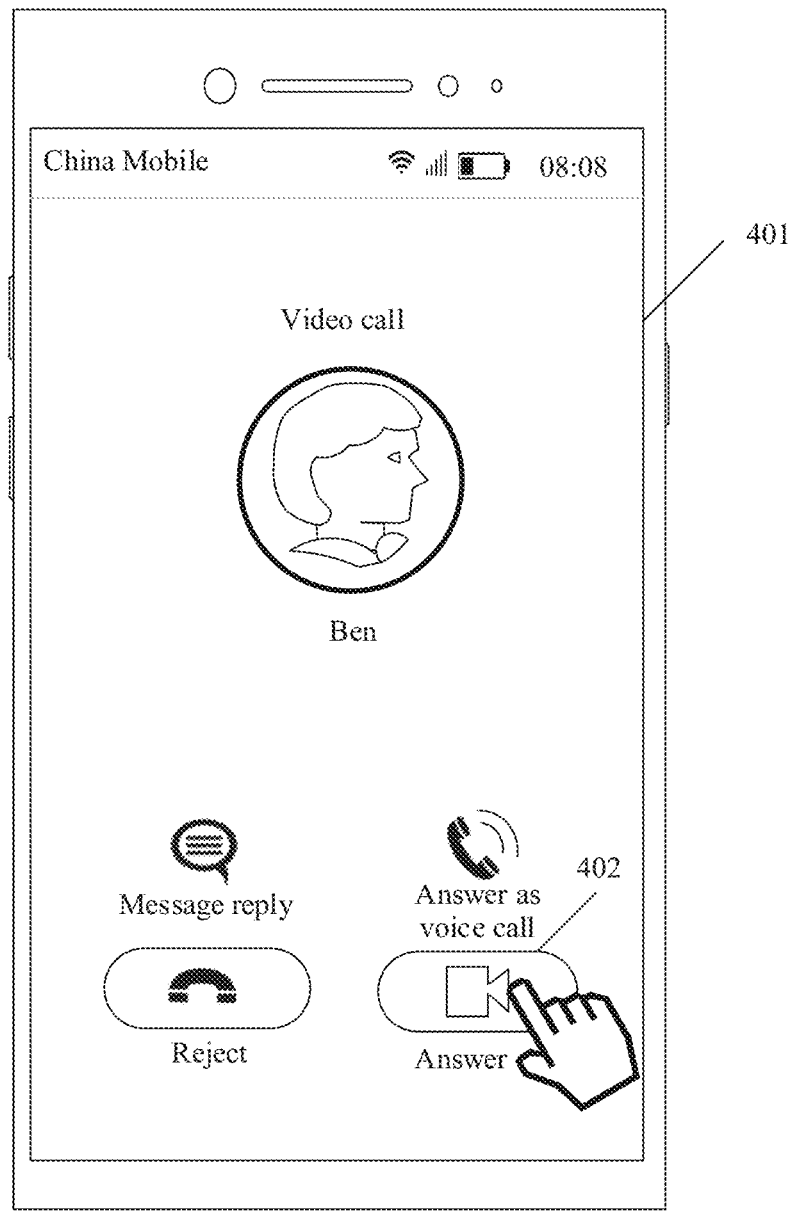
FIG. 4 is a schematic diagram of a display interface according to an embodiment of this application.

For another example, the first operation may be a tap operation of the user on an "Answer" button in an incoming call notification interface. (the incoming call notification interface may be the interface of the first function) of a video call. For example, the first operation may be a tap operation of the user on an "Answer" button 402 in an incoming call notification interface 401 of a video call shown in FIG. 4. Alternatively, the first operation may be a tap operation (not shown in the figure) of the user on a "Video call" button used to initiate a video call in the video call.

For another example, the first operation may alternatively be a tap operation of the user on a second button in a notification menu bar, and the notification menu bar is displayed and superimposed on the interface of the first function. A "Service schedule" button or switch may be preset in the mobile phone, and the "Service schedule" button or switch is the second button. For example, the notification menu bar of the mobile phone may include the "Service schedule" button or switch. The first operation may be a tap operation of the user on the "Service schedule" button or switch. When the mobile phone displays an interface of any application, the mobile phone may display the notification menu bar in response to the user's scheduling operation of showing the notification menu bar. The mobile phone may receive a tap operation of the user on "Service schedule" in the notification menu bar.

Figure 5:
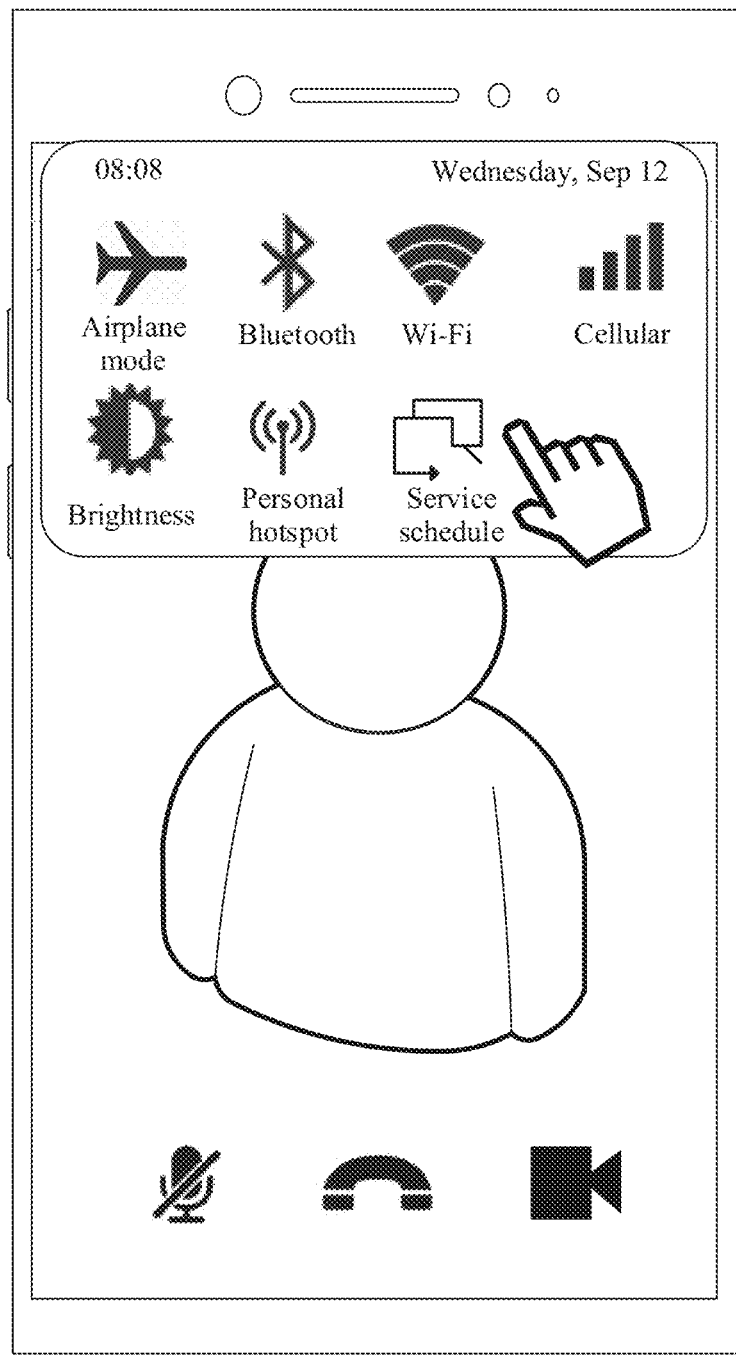
FIG. 5 is a schematic diagram of another display interface according to an embodiment of this application.

For example, when the mobile phone implements a video call function, the mobile phone displays an interface of the video call function, for example, a video call connection interface. The mobile phone receives an operation of showing the notification menu bar, and displays the notification menu bar. The first operation may be a tap operation of the user on the "Service schedule" button in the notification menu bar, as shown in FIG. 5.

For another example, the mobile phone implements a music playing function. The mobile phone is running a music application to play music. The user wants to schedule another electronic device in the device group to implement the music playing function. The mobile phone receives an operation of showing the notification menu bar, and displays the notification menu bar. The first operation may be a tap operation of the user on the "Service schedule" button in the notification menu bar.

It should be noted that, when the mobile phone receives the first operation of the user, the mobile phone needs to schedule another electronic device in the device group to implement a current function of the mobile phone. For example, the mobile phone is running a video application, but does not play a video, and the mobile phone displays a video file browsing interface. If the mobile phone receives the first operation of the user, a capability scheduled by the mobile phone is a display capability. If the mobile phone receives the first operation of the user when playing a video, a capability scheduled by the mobile phone may include: the image playing capability, the audio playing capability, and the video file decoding capability.

Step 303: The first electronic device displays a first interface in response to the first operation.

The first function may be divided into a plurality of sub-functions. Different sub-functions may be implemented by scheduling different capability services and different hardware modules. For example, the first electronic device may determine a capability required for implementing each of the plurality of sub-functions, and may determine, based on the capability actions that are of the capabilities of the devices and that are stored in the bus scheduler and the capability required for implementing each sub-function, a device identifier of a device that can implement each sub-function. The first electronic device may display the first interface based on the determined device identifier of the device that can implement each sub-function. The first interface may include a name of the to-be-implemented sub-function and a device identifier corresponding to the name of each sub-function. For example, the first function includes the first sub-function and the second sub-function. The first electronic device may determine, based on the capability information of the second electronic device and the first sub-function, that the first sub-function corresponds to the second electronic device, and may determine, based on the capability information of the third electronic device and the second sub-function, that the second sub-function corresponds to the third electronic device. Therefore, the first interface displayed by the first electronic device may include the device identifier of the second electronic device corresponding to the first sub-function, a name of the second sub-function, the device identifier of the third electronic device corresponding to the second sub-function, and the like.

Figure 6:
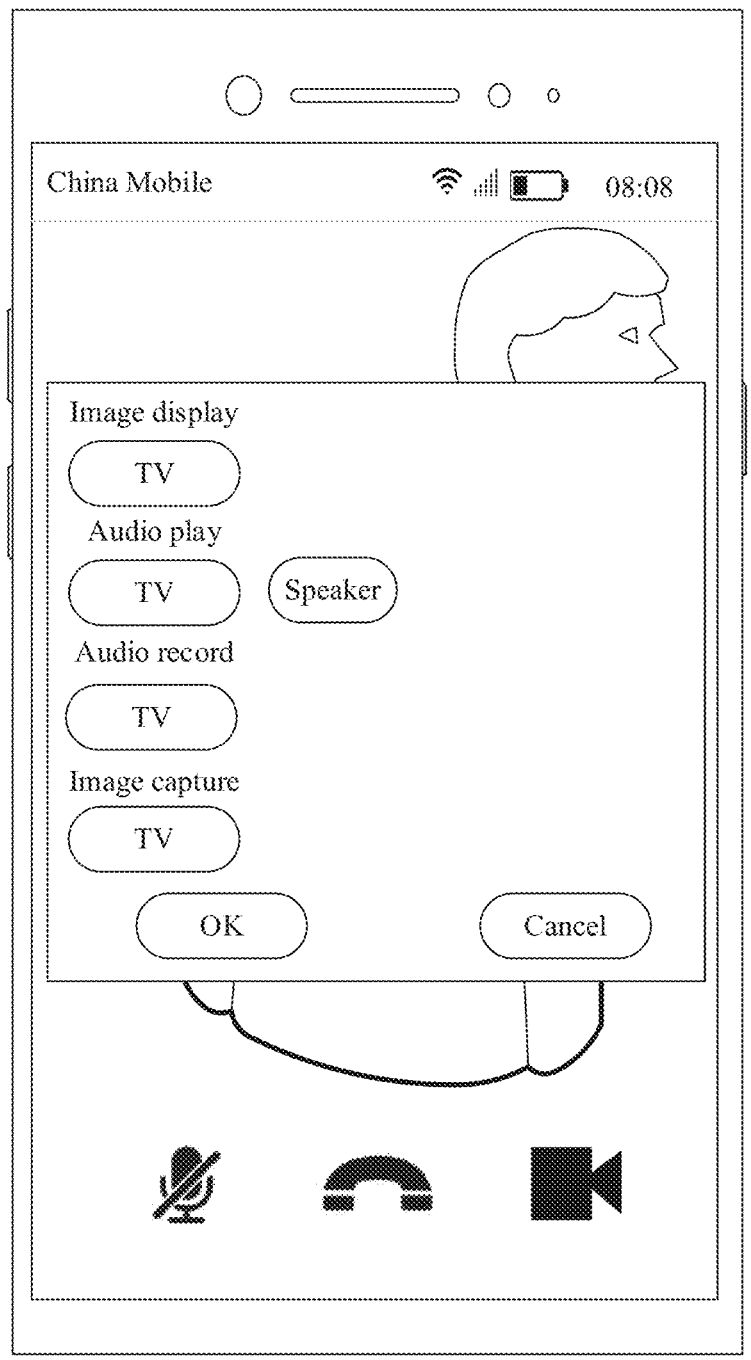
FIG. 6 is a schematic display diagram of a first interface according to an embodiment of this application.
Figure 7A:
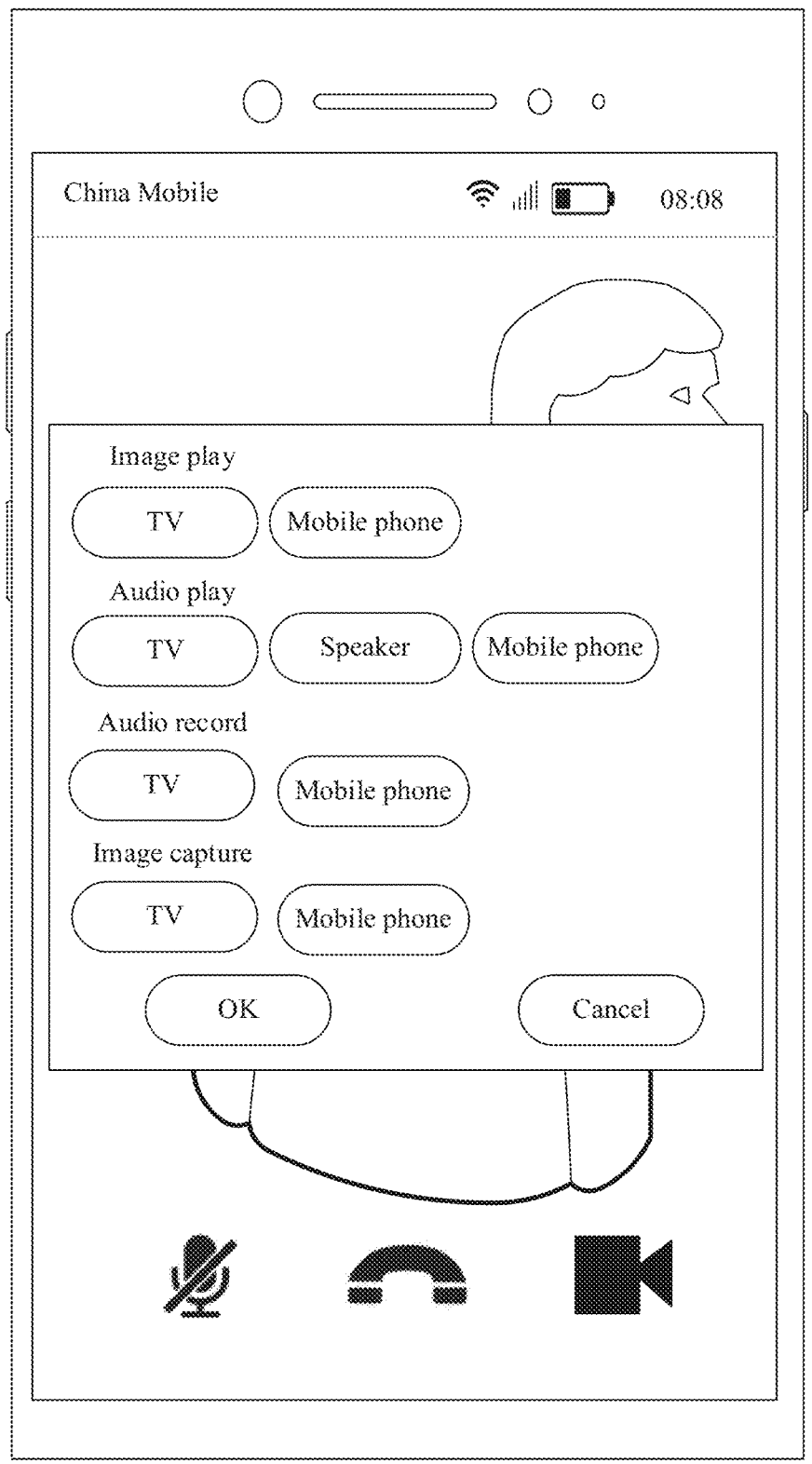
FIG. 7A is a schematic display diagram of another first interface according to an embodiment of this application.

For example, it is assumed that the second electronic device is a TV and the third electronic device is a speaker. The first function currently implemented by the mobile phone is a video call function of Video call. The first interface displayed by the mobile phone in response to the first operation may be shown in FIG. 6, and includes names of sub-functions obtained by dividing the video call function: image displaying, audio playing, audio recording, and image capturing, and a device identifier corresponding to the name of each sub-function. As shown in FIG. 6, a name of a sub-function is image displaying, and a device identifier corresponding to the sub-function name is an identifier of the TV. A name of a sub-function is audio playing, and a device identifier corresponding to the sub-function name is the identifier of the TV, an identifier of the speaker, and the like. In some other embodiments, the device identifiers corresponding to the names of the sub-functions in the first interface may further include the device identifier of the device. As shown in FIG. 7A, the device identifiers corresponding to the names of the sub-functions in the first interface not only include the device identifiers shown in FIG. 6, but also include an identifier of the mobile phone.

Figure 7B:
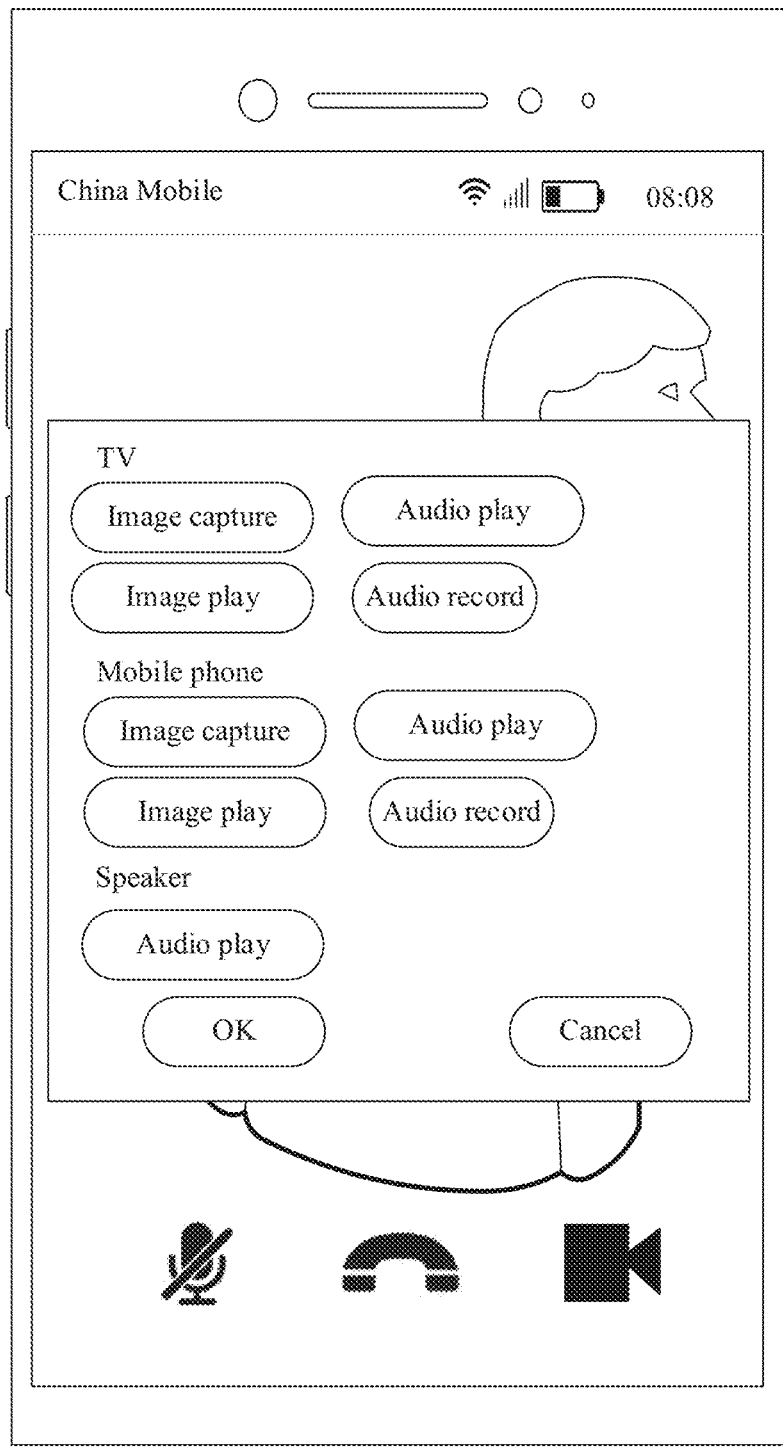
FIG. 7B is a schematic display diagram of another first interface according to an embodiment of this application.

It should be noted that the foregoing example is described by using an example in which the first interface includes a name of a sub-function and a device identifier corresponding to the name of the sub-function. In some other embodiments, content included in the first interface may also be displayed in a form of a correspondence between each device identifier and a name of a sub-function that can be implemented by a device corresponding to the device identifier. For example, as shown in FIG. 7B, a device identifier is a TV, and names of sub-functions corresponding to the device identifier include: image capturing, audio playing, image playing, and audio recording. A device identifier is a mobile phone, and names of sub-functions corresponding to the device identifier include: image capturing, audio playing, image playing, and audio recording. A device identifier is a speaker, and a name of a sub-function corresponding to the device identifier includes: audio playing.

It should be noted that, to meet a scheduling requirement of the user, a function being executed by the mobile phone is divided into sub-functions, and a device identifier of a device corresponding to a name of each sub-function is displayed in the first interface. The user may choose to schedule one or more devices to implement different sub-functions of the function. Therefore, the mobile phone may schedule a device having a capability corresponding to a sub-function in the device group, to meet a user requirement.

Step 304: The first electronic device receives a second operation of the user on the first interface, and schedules a capability service and a hardware module of a corresponding device based on the second operation, to implement a corresponding sub-function.

The second operation may include a selection operation of the user on device identifiers corresponding to names of one or more sub-functions.

In a first implementation, the capability information on the bus scheduler of the mobile phone includes a capability action and a capability service. The first interface displayed by the mobile phone is shown in FIG. 6 or FIG. 7A, and the second operation is a selection operation of the user on a corresponding device identifier in the first interface. When the first interface displayed by the mobile phone is shown in FIG. 7A, an operation of the user on the device identifier of the first electronic device may also be referred to as a third operation.

In a second implementation, the capability information on the bus scheduler of the mobile phone includes a capability action of a capability of the mobile phone and an identifier of an application corresponding to the capability.

Figure 8:
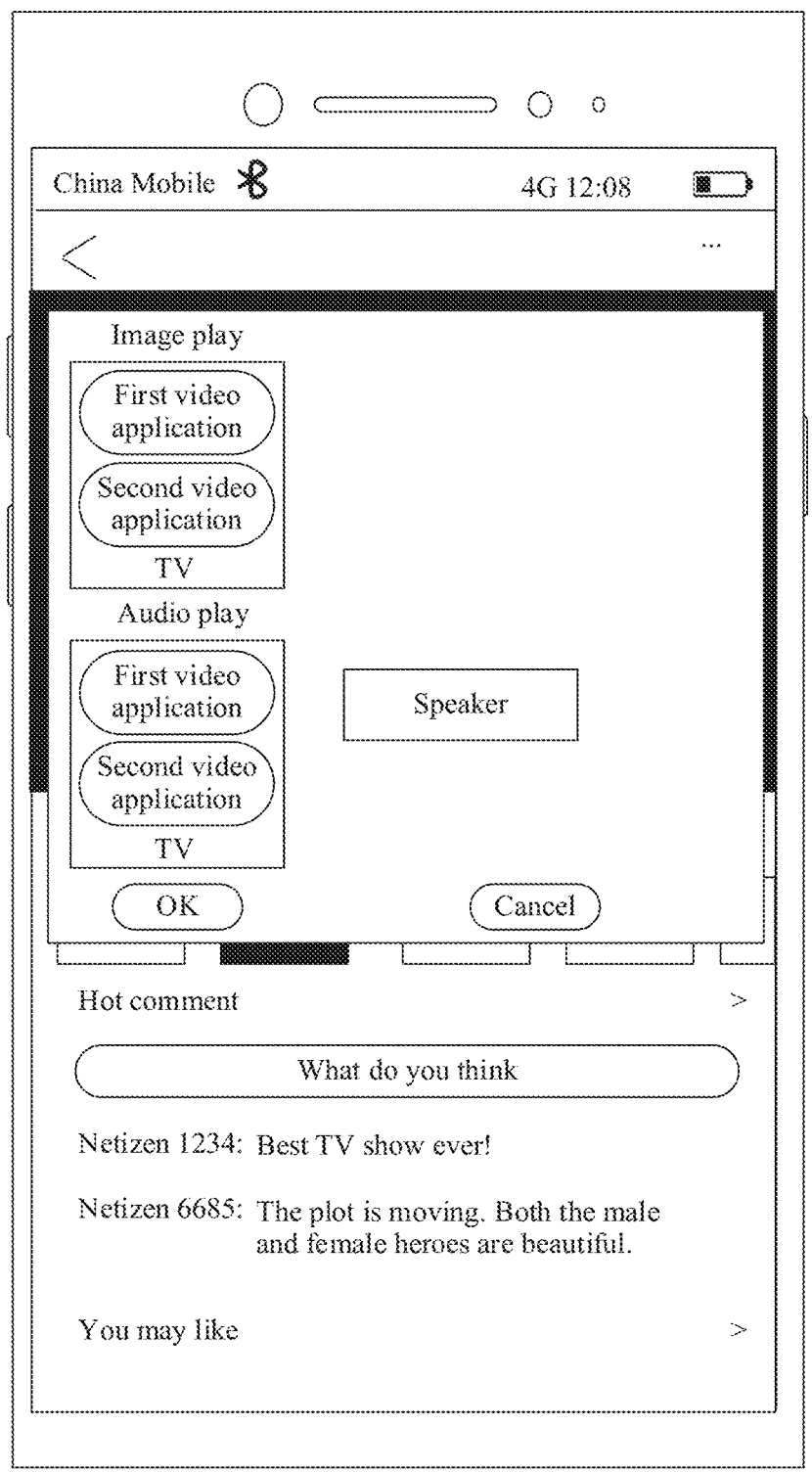
FIG. 8 is a schematic display diagram of another first interface according to an embodiment of this application.

For example, the second electronic device is a TV, the third electronic device is a speaker, and the first interface may be an interface shown in FIG. 8. The second operation may be a selection operation of the user on the interface shown in FIG. 8. In the display interface shown in FIG. 8, information corresponding to each capability not only includes a device identifier, but also includes an identifier of all application that is in a device corresponding to the device identifier and that can schedule the capability. The second operation is a selection operation on an identifier of an application in the interface shown in FIG. 8.

Figure 9A:
FIG. 9(a) and FIG. 9(b) are a schematic diagram of another display interface according to an embodiment of this application.
Figure 9B:
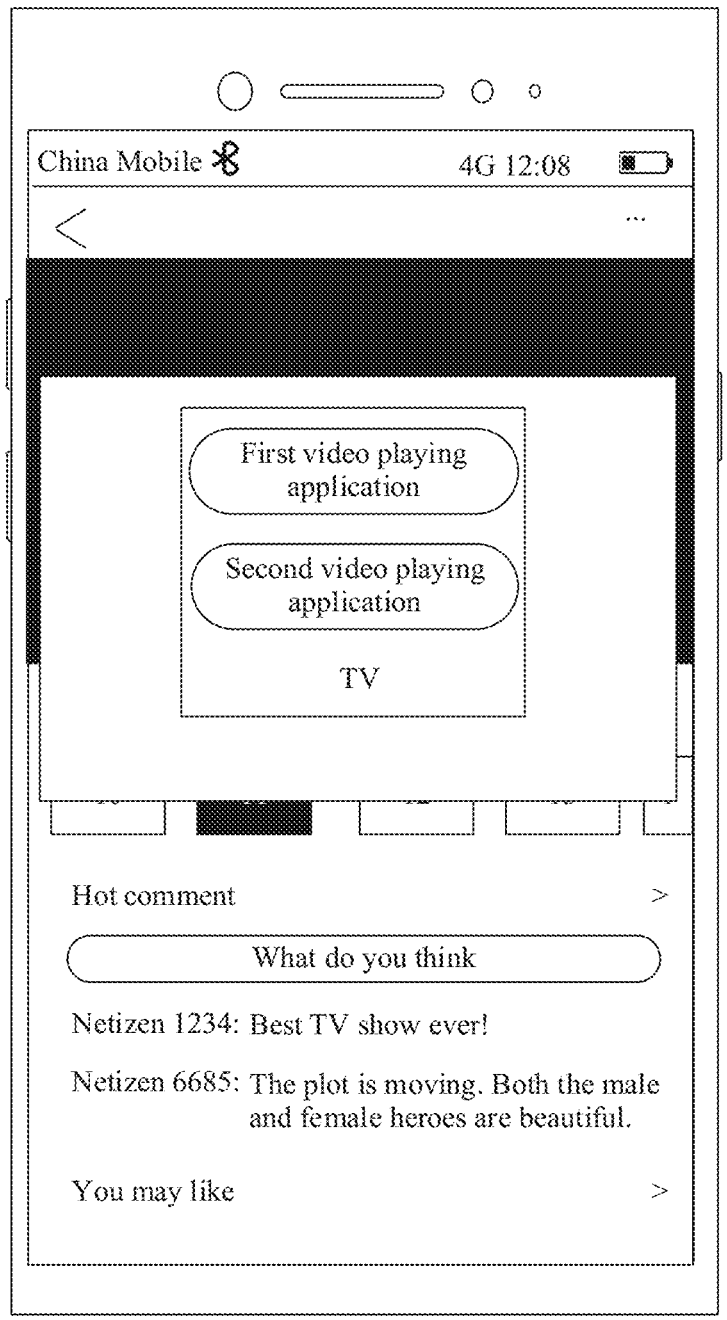

For another example, the second electronic device is a TV, the third electronic device is a speaker, and the first interface of the mobile phone is an interface shown in FIG. 9(*d*). The second operation includes a selection operation of the user on a device identifier in the interface shown in FIG. 9(*a*). After the user performs a selection operation on a corresponding device identifier, the mobile phone may further display a second interface. As shown in FIG. 9(*b*), the second interface includes an identifier of an application that is on the device corresponding to the device identifier and that can schedule a corresponding capability. The second operation further includes a selection operation of the user on the application identifier in the interface shown in FIG. 9(*b*). In addition, the second operation may further include a tap operation of the user on an OK button in the first interface, for example, an "OK" button in FIG. 6.

The foregoing is described by using an example in which after the user selects the device identifier in the first interface, the second interface is displayed on the mobile phone. The second interface may also be displayed on a device corresponding to the device identifier selected in the first interface. For example, the first interface is the interface shown in FIG. 9(*a*). After the user performs a selection operation on a device identifier of a TV corresponding to an image playing capability in the interface shown in FIG. 9(*a*), the second interface may be displayed on the TV. In this case, the second operation may further include a selection operation of the user on an application identifier in the second interface displayed on the TV. It should be noted that, if a capability of the device corresponds to only one identifier, the identifier may not be displayed. As shown in FIG. 9(a), a capability of the speaker is the audio playing capability, and the audio playing capability corresponds to only one application identifier. If the user selects the speaker in the audio playing capability, an identifier of an application that is in the speaker and that can schedule the audio playing capability does not need to be displayed in the second interface.

It should be noted that the electronic device schedules another electronic device in the device group based on selection by the user. For example, a display of the TV is large, and the user may choose to use the image playing capability of the TV set to implement the image playing function, so as to obtain better visual experience. The speaker has a good sound effect, and the user may use the audio playing capability of the speaker to implement the audio playing function, so as to obtain better auditory experience. In this way, "features" of the electronic devices can be better brought into play, and user experience can be improved.

In a possible implementation, after receiving the second operation, the mobile phone may determine, based on the second operation, an identifier of a device that executes a sub-function, and schedule a capability service and a corresponding hardware module that are in the device corresponding to the device identifier, to implement the corresponding sub-function.

In this embodiment of this application, in an implementation in which the capability information on the bus scheduler includes a capability action (Action) and a capability service (Service), when a sub-function needs to be implemented by scheduling a capability of another device, the mobile phone may schedule a capability service of the capability of the another device through a corresponding capability interface. When the capability service is scheduled, the corresponding hardware module is scheduled to implement the sub-function. For example, if the mobile phone is to implement a photo display function by using the TV, the mobile phone may schedule a capability service of the photo display capability of the TV trough an interface of the photo display capability of the TV. When the capability service of the photo display capability is scheduled, the display of the TV is scheduled, to implement the photo display function. An interface (for example, referred to as a service software development kit (Software Development Kit, SDK)) corresponding to a capability service of each capability in the electronic device may be preconfigured in the electronic device. The interface is scheduled, so that the electronic device can run a corresponding capability service. When running the capability service, the electronic device schedules a corresponding hardware module to implement a corresponding function.

Figure 10:
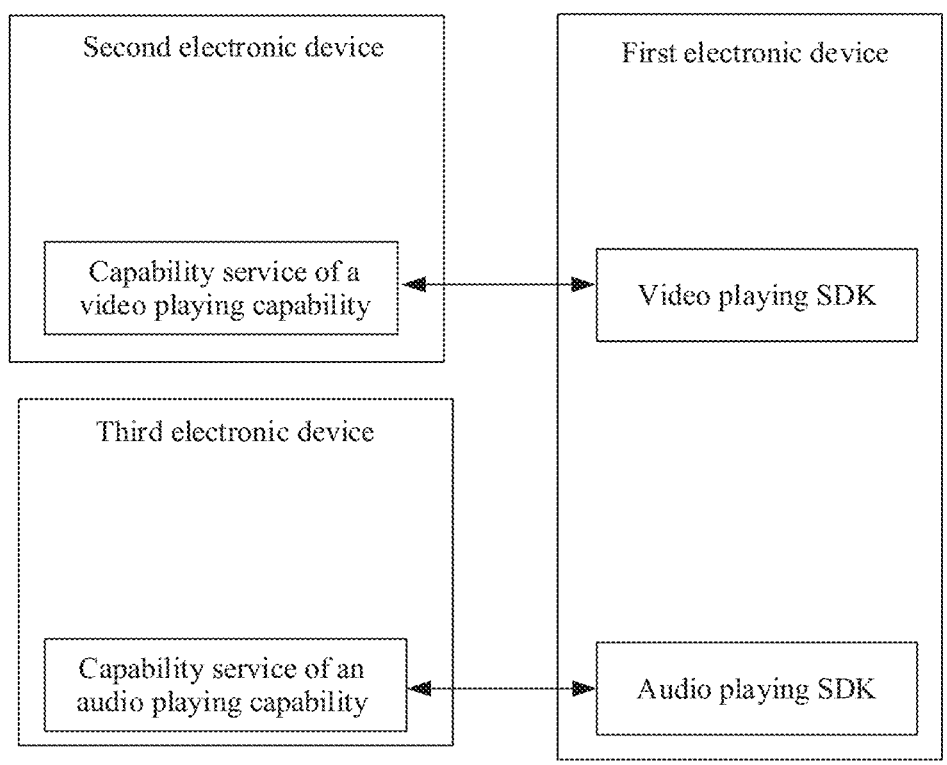
FIG. 10 is a schematic diagram of a device capability scheduling process according to an embodiment of this application.

For example, the mobile phone needs to implement a video playing function, and the function may be divided into three sub-functions: image playing, audio playing, and decoding. For example, the user chooses to use the mobile phone to implement the decoding function, use the second electronic device to implement the image playing function, and use the third electronic device to implement the audio playing function, as shown in FIG. 10. After receiving the second operation, the mobile phone may schedule the capability service of the decoding capability of the mobile phone by using a decoding SDK of the mobile phone. When the capability service of the decoding capability is scheduled, a hardware module for implementing the decoding capability is scheduled to implement the decoding function. The mobile phone schedules the capability service of the image playing capability of the second electronic device by using an image playing SDK of the second electronic device. When the image playing capability service is scheduled, a display of the second electronic device is scheduled to implement the image playing function. The mobile phone schedules the capability service of the audio playing capability of the third electronic device by using an audio playing SDK of the third electronic device. When the capability service of the audio capability is scheduled, a loudspeaker of the third electronic device is scheduled to implement the audio playing function.

Figure 11A:
FIG. 11(a) to FIG. 11(c) are a schematic diagram of another device capability scheduling process according to an embodiment of this application.
Figure 11B:
Figure 11C:
Figure 11C:
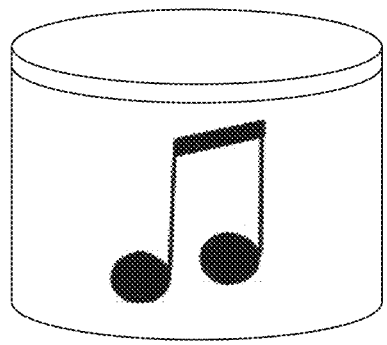

For example, the second electronic device is the TV, the third electronic device is the speaker, an application currently running on the mobile phone is a video application, and the mobile phone displays a video playing interface, for example, a video playing interface of the video application shown in FIG. 11(a). The mobile phone receives the first operation of the user, for example, a tap operation of the user on a "Play" button in the video playing interface. The mobile phone displays a first interface in response to the first operation. As shown in FIG. 11(b) and FIG. 11(c), the first interface includes capabilities: image playing and audio playing, and device identifiers corresponding to the capabilities. The mobile phone obtains the second operation of the user on the first interface, for example, the second operation is a selection operation of the user on "TV" in a device identifier corresponding to the image playing capability, and a selection operation of the user on "Speaker" in device identifiers corresponding to the audio playing capability. The mobile phone schedules the capability service of the image playing capability of the TV by using an image playing SDK of the TV When the capability service of the decoding capability is scheduled, the display of the TV is scheduled to implement the image playing sub-function. The mobile phone schedules the capability service of the audio playing capability of the speaker by using an audio playing SDK of the speaker. When the capability service of the audio playing capability is scheduled, the loudspeaker of the speaker is scheduled to implement the audio playing sub-function.

In this embodiment of this application, in an implementation in which the capability information on the bus scheduler includes a capability action (Action) and an identifier of an application corresponding to the capability, when a sub-function needs to be implemented by scheduling a capability of another device, the mobile phone may schedule a corresponding application on another device by using an identifier corresponding to the capability, that is, a handle of the application. When running on the device, the application schedules a hardware module of the device to implement the corresponding sub-function. For example, if a gallery application is installed on the TV, and the mobile phone needs to schedule the gallery application on the TV to implement the photo display function, the mobile phone may schedule the gallery application on the TV by using a handle that is of the gallery application on the TV and that is stored in the bus scheduler, so that the gallery application on the TV runs. When the gallery application on the TV runs, the capability service of photo displaying is scheduled. When the capability service of photo displaying is scheduled, the display of the TV is scheduled to implement the photo display function.

Optionally, after the foregoing steps are performed, the first electronic device may record a device scheduled by the first electronic device and a used specific capability of the device when a corresponding function is implemented this time. For example, in an example in which the function implemented this time is video playing, information recorded by the mobile phone is: the decoding capability of the mobile phone is scheduled, the image playing capability of the TV is scheduled, and the audio playing capability of the sound box is scheduled. When the user re-triggers to use another electronic device to implement the video playing function through cooperation, if the mobile phone, the TV, and the speaker are still in a same local area network, after the mobile phone receives the first operation, a displayed first interface further includes a button. The button corresponds to a scenario, and the scenario indicates a device scheduled by the mobile phone when the mobile phone implements the function last time and a used specific capability of the device. For example, still with reference to the foregoing example, the scenario is specifically to schedule the decoding capability of the mobile phone, schedule the image playing capability of the TV, and schedule the audio playing capability of the speaker. After the user performs a tap operation on the button, the mobile phone performs decoding, schedules the TV to implement the image playing function, and schedules the speaker to implement the audio playing function.

In this embodiment of this application, mutual scheduling may be performed, and the first electronic device may schedule different capabilities of other electronic devices in a same local area network, so that functions of the plurality of devices cooperate to implement a function of the first electronic device. In this way, "features" of the electronic devices in the device group are brought into play, to bring better user experience.

Other embodiments of this application provide an electronic device. The electronic device may include a memory and one or more processors. The memory is coupled to the one or more processors. The memory is configured to store computer program code, and the computer program code includes computer instructions. When the one or more processors execute the computer instructions, the electronic device may perform functions or steps performed by the mobile phone in the foregoing method embodiment. For a structure of the electronic device, refer to the structure of the electronic device 100 shown in FIG. 1.

Other embodiments of this application provide a display apparatus. The apparatus may be applied to an electronic device including the touchscreen. The apparatus is configured to perform functions or steps performed by the mobile phone in the foregoing method embodiment.

Embodiments of this application further provide a computer storage medium. The computer storage medium includes computer instructions. When the computer instructions are run on the foregoing electronic device, the electronic device is enabled to perform the functions or the steps performed by the mobile phone in the foregoing method embodiment.

An embodiment of this application further provides a computer program product. When the computer program product is run on a computer, the computer is enabled to perform the functions or steps performed by the mobile phone in the foregoing method embodiment.

The foregoing descriptions about implementations allow a person skilled in the art to understand that, for the purpose of convenient and brief description, division into the foregoing function modules is used as an example for illustration. In actual application, the foregoing functions can be allocated to different modules and implemented based on a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division, and may be other division during actual implementation.

For example, a plurality of units or components may be combined or may be integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods in the embodiments of this application. The foregoing storage medium includes any medium that can store program code, such as a USB flash drive, a removable hard disk, a read-only memory tread-only memory, ROM), a random access memory (random access memory, RAM), a magnetic disk, or an optical disc.

The foregoing descriptions are merely specific implementations of this application, but are not intended to limit the protection scope of this application. An variation or replacement within the technical scope disclosed in this application shall fall within the protection scope of this application. Therefore, the protection scope of this application shall be subject to the protection scope of the claims.

What is claimed is:

1. A device capability scheduling method implemented by a first electronic device, the device capability scheduling method comprising:
    implementing a first function, wherein the first function comprises a first sub-function and a second sub-function, and wherein the first sub-function is different from the second sub-function;
    detecting a first operation of a user;
    displaying, in response to the first operation, a first interface, wherein the first interface simultaneously displays a first name of the first sub-function, a first device identifier of the first electronic device corresponding to the first sub-function, a second device identifier of a second electronic device corresponding to the first sub-function, a second name of the second sub-function, and a third device identifier of the first electronic device corresponding to the second sub-function, and wherein the first electronic device and the second electronic device are in a same local area network;

detecting a second operation of the user on the second device identifier of the second electronic device;

in response to the second operation, invoking the second electronic device to implement the first sub-function and continue invoking the second sub-function;

after invoking the second electronic device to implement the first sub-function, detecting a third operation of the user on the first device identifier of the first electronic device; and in response to the third operation, switching the first sub-function from the second electronic device back to the first electronic device.

2. The device capability scheduling method of claim 1, wherein after displaying the first interface, the device capability scheduling method further comprises:

detecting a fourth operation of the user on the third device identifier; and executing, in response to the fourth operation, the second sub-function.

3. The device capability scheduling method of claim 2, wherein sending the data corresponding to the first sub-function to the second electronic device comprises:

preconfiguring a capability service in the first electronic device or generating and storing the capability service in the first electronic device;

scheduling a capability service of the second electronic device, wherein the first sub-function is implemented by scheduling the capability service; and sending the data corresponding to the first sub-function to the second electronic device to instruct the second electronic device to run the capability service and execute the first sub-function.

4. The device capability scheduling method of claim 1, wherein the first interface further displays a first identifier of a first application and a second identifier of a second application, wherein the first identifier and the second identifier correspond to the first device identifier, wherein the first application and the second application are installed on the second electronic device, wherein the second operation is on the first identifier, and wherein the device capability scheduling method further comprises sending, in response to the second operation, the first identifier to the second electronic device to instruct the second electronic device to execute the first sub-function using the first application.

5. The device capability scheduling method of claim 1, wherein the second operation selects the first device identifier.

6. The device capability scheduling method of claim 1, wherein the first electronic device stores first capability information of the first electronic device, and wherein before displaying the first interface, the device capability scheduling method further comprises:

establishing a first WI-FI connection to the second electronic device;

establishing a second WI-FI connection to a third electronic device;

obtaining the first device identifier and second capability information of the second electronic device;

obtaining the second device identifier and third capability information of the third electronic device;

associating, based on the second capability information and the first sub-function, the first sub-function with the second electronic device; and associating, based on the third capability information and the second sub-function, the second sub-function with the third electronic device.

7. The device capability scheduling method of claim 1, wherein the first function is a video playing function or a video call function, wherein when the first function is the video playing function, each of the first sub-function and the second sub-function is image playing, audio playing, or decoding, and wherein when the first function is the video call function, each of the first sub-function and the second sub-function is image displaying, audio playing, audio recording, or image capturing.

8. The device capability scheduling method of claim 1, wherein either the first operation is a first tap operation of the user on a first button for enabling the first function in a second interface of the first function, or the first operation is a second tap operation of the user on a second button in a notification menu bar, and wherein the notification menu bar is displayed and superimposed on the second interface.

9. The device capability scheduling method of claim 1, wherein the first interface further simultaneously displays a fourth device identifier of a third electronic device corresponding to the second sub-function, and wherein the method further comprises:

detecting a fifth operation of the user on the fourth device identifier; and in response to the fifth operation on the fourth device identifier of the third electronic device, invoking the second electronic device to implement the second sub-function.

10. A first electronic device, comprising:

a memory configured to store instructions; and one or more processors coupled to the memory and configured to execute the instructions to cause the first electronic device to:

implement a first function, wherein the first function comprises a first sub-function and a second sub-function, and wherein the first sub-function is different from the second sub-function;

detect a first operation of a user;

display, in response to the first operation, a first interface, wherein the first interface simultaneously displays a first name of the first sub-function, a first device identifier of the first electronic device corresponding to the first sub-function, and a second device identifier of a second electronic device corresponding to the first sub-function, a second name of the second sub-function, and a third device identifier of the first electronic device corresponding to the second sub-function, and wherein the first electronic device and the second electronic device are in a same local area network;

detect a second operation of the user on the first device identifier of the second electronic device;

in response to the second operation, invoke the second electronic device to implement the first sub-function and continue to implement the second sub-function;

after invoking the second electronic device to implement the first sub-function, detect a third operation of the user on the first device identifier of the first electronic device; and in response to the third operation, switch the first sub-function from the second electronic device back to the first electronic device.

11. The first electronic device of claim 10, wherein after the instructions cause the first electronic device to display the first interface, the instructions further cause the first electronic device to:

detect a fourth operation of the user on the third device identifier; and execute, in response to the fourth operation, the second sub-function.

12. The first electronic device of claim 10, wherein the first interface further displays a first identifier of a first application and a second identifier of a second application, wherein the first identifier and the second identifier correspond to the first device identifier, wherein the first application and the second application are installed on the second electronic device, wherein the second operation is on the first identifier, and wherein the instructions further cause the first electronic device to send, in response to the second operation, the first identifier to the second electronic device to instruct the second electronic device to execute the first sub-function using the first application.

13. The first electronic device of claim 10, wherein the second operation selects the first device identifier.

14. The first electronic device of claim 10, wherein the first electronic device stores first capability information of the first electronic device, and wherein before the instructions cause the first electronic device to display the first interface, the instructions cause the first electronic device to:

establish a first WI-FI connection to the second electronic device;

establish a second WI-FI connection to a third electronic device;

obtain the first device identifier and second capability information of the second electronic device;

obtain the second device identifier and third capability information of the third electronic device;

associating, based on the second capability information and the first sub-function, the first sub-function with the second electronic device; and associating, based on the third capability information and the second sub-function, the second sub-function with the third electronic device.

15. A computer program product comprising computer-executable instructions stored on a non-transitory computer-readable medium that, when executed by one or more processors, cause a first electronic device to:

implement a first function, wherein the first function comprises a first sub-function and a second sub-function, and wherein the first sub-function is different from the second sub-function;

detect a first operation of a user;

display, in response to the first operation, a first interface, wherein the first interface simultaneously displays a first name of the first sub-function, a first device identifier of the first electronic device corresponding to the first sub-function, and a second device identifier of a second electronic device corresponding to the first sub-function, a second name of the second sub-function, and a third device identifier of the first electronic device corresponding to the second sub-function, and wherein the first electronic device and the second electronic device are in a same local area network;

detect a second operation of the user on the first device identifier of the second electronic device;

in response to the second operation, invoke the second electronic device to implement the first sub-function and continue to implement the second sub-function;

after invoking the second electronic device to implement the first sub-function, detect a third operation of the user on the first device identifier of the first electronic device; and in response to the third operation, switch the first sub-function from the second electronic device back to the first electronic device.

16. The computer program product of claim 15, wherein after the instructions cause the first electronic device to display the first interface, the instructions further cause the first electronic device to:

detect a fourth operation of the user on the third device identifier; and execute, in response to the fourth operation, the second sub-function.

17. The computer program product of claim 15, wherein the first interface further displays a first identifier of a first application and a second identifier of a second application, wherein the first identifier and the second identifier correspond to the first device identifier, wherein the first application and the second application are installed on the second electronic device, wherein the second operation is on the first identifier, and wherein the instructions further cause the first electronic device to send, in response to the second operation, the first identifier to the second electronic device to instruct the second electronic device to execute the first sub-function using the first application.

18. The computer program product of claim 15, wherein the second operation selects the first device identifier.

19. The computer program product of claim 15, wherein the first electronic device stores first capability information of the first electronic device, and wherein before the instructions cause the first electronic device to display the first interface, the instructions cause the first electronic device to:

establish a first WI-FI connection to the second electronic device;

establish a second WI-FI connection to a third electronic device;

obtain the first device identifier and second capability information of the second electronic device;

obtain the second device identifier and third capability information of the third electronic device;

associate, based on the second capability information and the first sub-function, the first sub-function with the second electronic device; and associate, based on the third capability information and the second sub-function, the second sub-function with the third electronic device.

20. The computer program product of claim 15, wherein the first function is a video playing function or a video call function, wherein when the first function is the video playing function, each of the first sub-function and the second sub-function is image playing, audio playing, or decoding, and wherein when a second function is the video call function, each of the first sub-function and the second sub-function is image displaying, audio playing, audio recording, or image capturing.

* * * * *